(12) United States Patent
Yamagiwa et al.

(10) Patent No.: US 8,706,963 B2
(45) Date of Patent: Apr. 22, 2014

(54) STORAGE MANAGING SYSTEM, COMPUTER SYSTEM, AND STORAGE MANAGING METHOD

(75) Inventors: Hiromichi Yamagiwa, Yokohama (JP); Naoshi Maniwa, Yokohama (JP); Hideo Ohata, Fujisawa (JP); Yasufumi Uchiyama, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 266 days.

(21) Appl. No.: 13/384,869

(22) PCT Filed: Jun. 2, 2011

(86) PCT No.: PCT/JP2011/062676
§ 371 (c)(1),
(2), (4) Date: Jan. 19, 2012

(87) PCT Pub. No.: WO2012/164714
PCT Pub. Date: Dec. 6, 2012

(65) Prior Publication Data
US 2012/0311260 A1    Dec. 6, 2012

(51) Int. Cl.
*G06F 12/00* (2006.01)
(52) U.S. Cl.
USPC ............................................................. 711/117
(58) Field of Classification Search
None
See application file for complete search history.

(56) References Cited

U.S. PATENT DOCUMENTS

| 2008/0270720 | A1 | 10/2008 | Tanabe et al. |
| 2009/0006876 | A1 | 1/2009 | Fukatani et al. |
| 2009/0300285 | A1 | 12/2009 | Nagai et al. |
| 2010/0115222 | A1 | 5/2010 | Usami |
| 2010/0125715 | A1 | 5/2010 | Takamatsu et al. |
| 2010/0325355 | A1 | 12/2010 | Kezuka et al. |
| 2011/0161406 | A1* | 6/2011 | Kakeda et al. .............. 709/203 |
| 2012/0144147 | A1* | 6/2012 | Inoue et al. .................. 711/170 |
| 2012/0278569 | A1* | 11/2012 | Kawakami et al. .......... 711/162 |

FOREIGN PATENT DOCUMENTS

| JP | 2005-301627 | A2 | 10/2005 |
| JP | 2007-066259 | A2 | 3/2007 |
| JP | 2008-269465 | A2 | 11/2008 |
| JP | 2009-009194 | A2 | 1/2009 |
| JP | 2010-108341 | A2 | 5/2010 |
| JP | 2010-122814 | A2 | 6/2010 |
| JP | 2011-081580 | A2 | 4/2011 |

* cited by examiner

*Primary Examiner* — Brian Peugh
(74) *Attorney, Agent, or Firm* — Volpe and Koenig, P.C.

(57) ABSTRACT

The present invention provides a configuration which can realize both two objects of prevention of performance deterioration and a reduction in storage management cost and shift a volume to a storage device which supports a hierarchical pool. To provide the configuration, a storage managing system acquires access information indicating an access load to a logical volume in a storage subsystem from a device file in a host server as access information in a page unit. The storage managing system acquires, from a storage subsystem having a hierarchical pool function, information concerning the configuration and a capacity of hierarchies of the storage subsystem. A capacity of the logical volume is calculated from the number of pages and a page unit capacity indicated by the access information. The storage managing system calculates, on the basis of information concerning the capacity of the logical volume and information concerning the configuration and the capacity of the hierarchies, a configuration candidate of a hierarchical pool for allocating a storage region for storing data included in the logical volume via the hierarchical pool to a virtual logical pool and outputs the configuration candidate of the hierarchical pool.

15 Claims, 30 Drawing Sheets

Fig. 6

| Page identifier | Device file identifier | Host identifier | Access information [I/O number/sec.] |
|---|---|---|---|
| 100 | DF1 | HOST1 | 400 |
| 110 | DF1 | HOST1 | 45 |
| 120 | DF1 | HOST1 | 500 |
| 130 | DF1 | HOST1 | 250 |
| 140 | DF2 | HOST1 | 200 |
| ... | ... | ... | ... |

Fig. 7

| Volume identifier | Storage device identifier | Capacity [GB] | Storage media type |
|---|---|---|---|
| Volume1 | VSP@111 | 200 | SSD |
| Volume2 | VSP@111 | 20 | SSD |
| Volume3 | VSP@111 | 50 | SAS |
| Volume4 | VSP@111 | 100 | SATA |
| ... | ... | ... | ... |

Fig. 11

| Candidate identifier | High-order hierarchy capacity [GB] | Intermediate-order hierarchy capacity [GB] | Low-order hierarchy capacity [GB] | High-order hierarchy boundary value [I/O number] | Intermediate-order hierarchy boundary value [I/O number] |
|---|---|---|---|---|---|
| Plan1 | 200 | 100 | 50 | 350 | 60 |
| ... | ... | ... | ... | ... | ... |

Fig. 12

| Candidate identifier | Expense |
|---|---|
| Plan1 | 300 |
| ... | ... |

| Pool volume identifier | Storage device identifier | Pool identifier |
|---|---|---|
| Pool Vol2 | VSP@111 | Pool1_VSP@111 |
| Pool Vol3 | VSP@111 | Pool1_VSP@111 |
| Pool Vol4 | VSP@111 | Pool2_VSP@111 |
| Pool Vol5 | VSP@222 | Pool1_VSP@222 |
| Pool Vol6 | VSP@222 | Pool1_VSP@222 |
| Pool Vol7 | VSP@222 | Pool1_VSP@222 |
| ... | ... | ... |

2801  2802  2803  2508

| Pool identifier |
|---|
| Pool1_VSP@111 |

| Page identifier | Access information [I/O number/sec.] |
|---|---|
| 100 | 400 |
| 110 | 45 |
| 120 | 500 |
| 130 | 250 |
| 9000 | 400 |
| 9100 | 45 |
| 9200 | 500 |
| ... | ... | ns
STORAGE MANAGING SYSTEM, COMPUTER SYSTEM, AND STORAGE MANAGING METHOD

TECHNICAL FIELD

The present invention relates to a storage managing system, a computer system, and a storage managing method and relates to, for example, a technique for creating a pool (a hierarchical pool) using plural kinds of storage devices having different performances and providing a virtual logical volume.

BACKGROUND ART

As a virtual technique for a storage device, there is a storage device which creates a pool (a hierarchical pool) using plural kinds of storage devices having different performances (see, for example, Patent Literature 1). In the hierarchical pool, a storage region of a virtual logical volume is allocated in a data unit called a page and a storage device in which the page is arranged is periodically switched according to an access characteristic (I/O number (IOPS), etc.) per unit time in the page unit (see, for example, Patent Literature 2). Specifically, a storage region of a high-performance storage device (disk device) is preferentially allocated to a page having a high access characteristic. Consequently, compared with a case in which data is allocated from a single type of a storage device in a virtual logical volume unit, in a case in which a virtual logical volume in a hierarchical pool is configured, when a configuration satisfying a performance requirement and a capacity requirement of a system is designed, a necessary capacity of a high-performance storage device decreases and it is possible to reduce storage management cost.

CITATION LIST

Patent Literature

Patent Literature 1: JP Patent Publication (Kokai) No. 2007-066259A
Patent Literature 2: JP Patent Publication (Kokai) No. 2005-301627A

SUMMARY OF INVENTION

Technical Problem

When a volume of a storage device (also referred to as a storage subsystem) used by a host server in operation is shifted to a storage device which supports the virtual logical volume of the hierarchical pool (including replacement of the storage device), in order to satisfy a performance requirement necessary for a job, the hierarchical pool has to be configured not to cause performance overflow. More specifically, for example, when the host server uses one or plural storage volumes of a storage device which does not support a hierarchical pool, to shift those storage volumes to a storage device which supports a virtual logical volume of a hierarchical pool while satisfying a performance requirement necessary for a job, it is necessary to measure an access characteristic in a page unit in a storage device associated with the host server and calculate a capacity of storage media included in hierarchies on the basis of the access characteristic.

In general, in order to eliminate an influence on a job due to performance deterioration, a capacity of a high-order hierarchy in a hierarchical pool is set sufficiently large in advance. Certainly, this makes it possible to prevent the performance deterioration. However, as a result, an effect of a reduction in storage management cost, which is an advantage of the hierarchical pool, decreases.

In this way, under the present situation, a technique for shifting, without deteriorating the performance of a storage device and without increasing storage management cost, a volume of a normal storage device to a storage device which supports a hierarchical pool is not established.

The present invention has been devised in view of such a situation and provides a configuration which can realize both the two objects of prevention of performance deterioration and a reduction in storage management cost and shift a volume to a storage device which supports a hierarchical pool.

Solution to Problem

In order to solve the problem, in the present invention, a storage managing system acquires access information indicating an access load to a logical volume in a storage subsystem from a device file in a host server as access information in a page unit. The storage managing system acquires, from a storage subsystem having a hierarchical pool function, information concerning the configuration and a capacity of hierarchies of the storage subsystem. A capacity of the logical volume is calculated from the number of pages and a page unit capacity indicated by the access information. The storage managing system calculates, on the basis of information concerning the capacity of the logical volume and information concerning the configuration and the capacity of the hierarchies, a configuration candidate of a hierarchical pool for allocating a storage region for storing data included in the logical volume via the hierarchical pool to a virtual logical pool and outputs the configuration candidate of the hierarchical pool.

Further characteristics related to the present invention will be made apparent from the description of this specification and the accompanying drawings. A form of the present invention is attained and realized by elements, a combination of various elements, the following detailed description, and a form of the appended claims.

It is necessary to understand that the description of this specification is merely a typical illustration and by no means limits the claims or application examples of the present invention.

Advantageous Effects of Invention

According to the present invention, it is possible to provide a configuration which can realize both the two objects of prevention of performance deterioration and a reduction in storage management cost and shift a volume to a storage device which supports a hierarchical pool.

BRIEF DESCRIPTION OF DRAWINGS

FIG. 6 is a diagram showing a configuration example of device file page information 508.

FIG. 7 is a diagram showing a configuration example of volume information 509.

FIG. 11 is a diagram showing a configuration example of hierarchical pool configuration candidate information 513.

FIG. 12 is a diagram showing a configuration example of hierarchical pool configuration candidate expense information 515.

FIG. 30 is a diagram showing a configuration example of analysis target page information (table) 2510.

DESCRIPTION OF EMBODIMENTS

Figure 1:
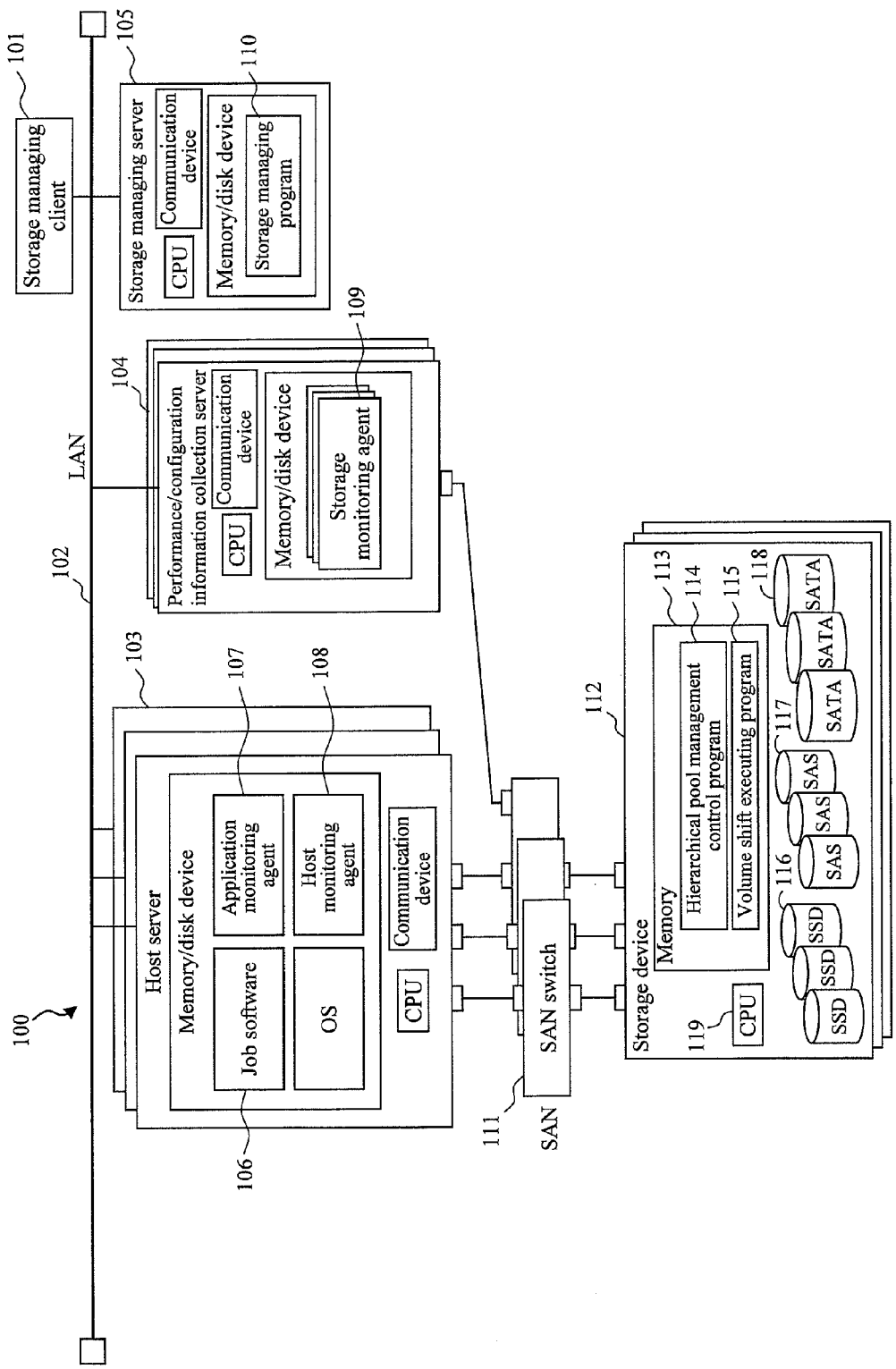
FIG. 1 is a diagram showing a schematic configuration of a storage system 100 according to the present invention.

The present invention provides a technique for efficiently shifting a logical volume of a normal storage device not having a hierarchical pool function to a storage device having the hierarchical pool function or a technique for efficiently realizing system shift when the normal storage device is replaced with the storage device having the hierarchical pool function and operated.

Embodiments of the present invention are explained below with reference to the accompanying drawings. In the accompanying drawings, in some case, functionally the same components are denoted by the same numbers. The accompanying drawings show specific embodiments and examples conforming to the principle of the present invention. However, these are for understanding of the present invention and are never used to limitedly interpret the present invention.

In the embodiments, the embodiments are explained in detail sufficiently for those skilled in the art to carry out the present invention. However, it is necessary to understand that other implementations and forms are possible and changes of configurations and structures and replacement of various elements are possible without departing from the scope and the spirit of the technical idea of the present invention. Therefore, the following description should not be interpreted to be limited to the embodiments.

Further, as explained later, the embodiments of the present invention may be implemented by software running on a general-purpose computer or may be implemented by dedicated hardware or a combination of the software and the hardware.

In the following explanation, various kinds of information of the present invention are explained in a "table" format. These kinds of information do not always have to be represented in a data structure by a table and may be represented in a data structure of a list, a DB, a queue, or the like or other data structures. Therefore, to indicate that the information does not rely on a data structure, "table", "list", "DB", "queue", and the like could be simply referred to as "information".

When contents of the information are explained, it is possible to use expressions "identification information", "identifier", "title", "name", and "ID". These can be replaced with one another.

In the following explanation, processing in the embodiments of the present invention is explained with "program" set as a subject (an operation entity). However, the program is executed by a processor to perform set processing using a memory and a communication port (a communication control device). Therefore, the processor may be a subject in the explanation. Processing disclosed with the program set as the subject may be processing performed by a computer or an information processing apparatus such as a management server. A part or all of the program may be realized by dedicated hardware or may be formed as a module. Various programs may be installed in computers by a program distribution server or storage media.

(1) First Embodiment

System Configuration

FIG. 1 is a diagram showing a schematic configuration of a storage system (which can also be referred to as computer system) 100 according to the present invention. FIG. 1 shows the configuration of the storage system 100 after a normal storage device is replaced with a storage device 112 having a hierarchical pool function (which supports a hierarchical pool function).

The storage system 100 includes a storage managing client 101, at least one host server 103, a performance/configuration information collecting server 104, a management server 105, and at least one storage device (which can also be referred to as a storage subsystem) 112, which are connected via a LAN (Local Area Network) 102. The host server (which can also be referred to as a host device or a host computer) 103, the performance/configuration information collecting server 104, and the storage device 112 are connected via an SAN (Storage Area Network) switch 111. In the configuration shown in FIG. 3, the storage managing client 101, the performance/configuration information collecting server 104, and the management server 105 are shown as separate computers. However, one computer may be configured to have the three functions. Therefore, not only when the functions of the storage managing client 101, the performance/configuration information collecting server 104, and the management server 105 are realized by one computer but also when the functions are realized by plural computers, the computers can be regarded as configuring one storage managing system.

With the components explained above, the storage system 100 provides a job system in a storage area network (SAN) environment, a system which manages execution of the job system, and a system which manages storage in the SAN environment. Hardware included in the job system includes the at least one host server 103, the at least one SAN switch 111, the at least one storage device 112, and the LAN 102. Hardware included in the system for storage management in the SAN environment includes the storage managing client 101, the at least one performance/configuration information collecting server 104, and the management server 105.

The storage managing client 101 is a computer for a user to input various instructions and information to the host server 103, the performance/configuration information collecting server 104, the management server 105, and the storage device 112. Although not shown in the figure, the storage managing client 101 includes hardware (a CPU, a memory, a communication device, an input and output device, etc.) included in a normal computer. For example, as the instructions input from the storage managing client 101 to the management server 105, there are a target response performance value, a selection instruction for a shift target device file, and the like. GUI information for hierarchical pool configuration candidate display is provided from the management server 105 to the storage managing client 101 and GUI display (see FIG. 21 (FIG. 36 in a second embodiment) is performed.

The host server 103 includes a CPU (Central Processor Unit: which can also be simply referred to as processor), a communication device, and a memory/disk device. In the memory/disk device, an OS (Operation System), job software 106, an application monitoring agent 107, a host monitoring agent 108, and the like are stored. The host server 103 executes operations for, for example, issuing an I/O request to the storage device 112 according to, for example, a request from a not-shown client terminal, acquiring information from the storage device 112, and providing the client terminal with acquired information. The job software 106 is software included in a job system and is, for example, a DB (database) managing program and a mail application. The application monitoring agent 107 is a program for monitoring an execution state of the job software 106. The host monitoring agent 108 is a program for monitoring an operation state of the host server 103.

Like the normal computer, the performance/configuration information collecting server 104 includes a CPU, a communication device, and a memory/disk device. In the memory/disk device, the storage monitoring agent 109 corresponding to the at least one storage device 112 is stored. The storage monitoring agent 109 is started at predetermined timing (e.g., timing periodically determined by a timer according to scheduling configuration) or started according to a request of a storage managing program 110. The storage monitoring agent 109 is a program for acquiring configuration/capacity information and/or performance information from a monitoring target device, components, and software covered by the storage monitoring agent 109. As explained later, information acquired by the storage monitoring agent 109 is provided to the management server 105 and used for processing for calculating a hierarchical pool configuration candidate.

Figure 25:
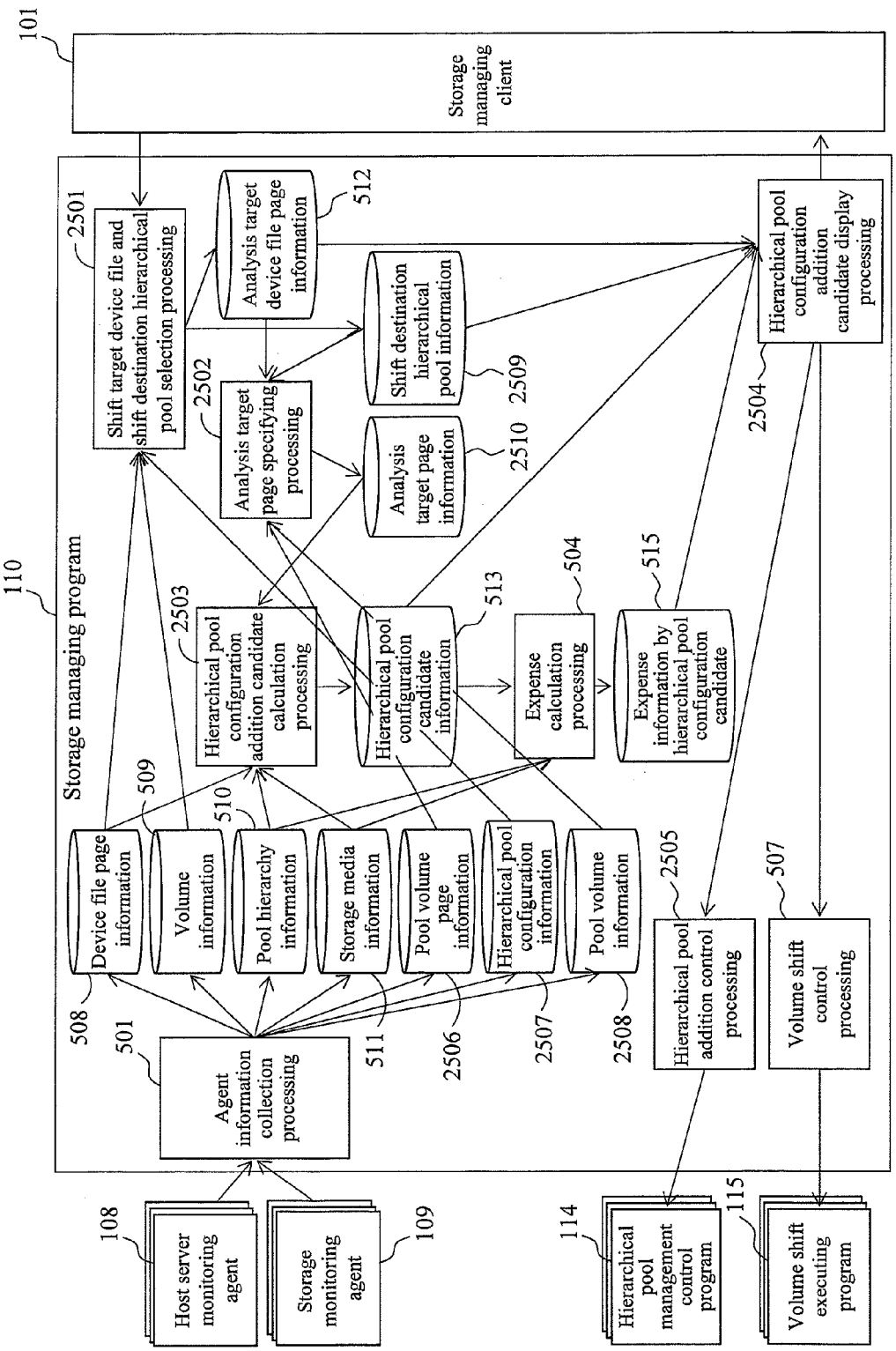
FIG. 25 is a block diagram for explaining functions of a storage managing program 110 in the second embodiment.

Like the normal computer, the management server 105 includes a CPU, a communication device, and a memory/disk device. In the memory/disk device, the storage managing program 110 is stored. The storage managing program 110 is a program for performing collection and monitoring of configuration information of an SAN, performance information, and application information and shifting a virtual logical volume to reduce cost according to a state of use of storage devices 317 to 319. The storage managing program 110 uses dedicated agents for the configuration information, the performance information, and the application information in order to acquire the configuration information, the performance information, and the application information from hardware and software included in the SAN. An overview of processing executed by the storage managing program 110 is explained with reference to FIG. 5 (FIG. 25 in the second embodiment).

The storage device 112 includes a CPU 119, a memory 113, and SSDs (Solid State Disks) 116, SASs (Serial Attached SCSIs) 117, and SATAs (Serial ATAs) 118, which are plural kinds of storage media (which can also be referred to as disk devices or storage devices). The CPU 119 functions as a control unit which controls the operation of the storage device 112 using various programs stored in the memory 113. For example, the CPU 119 controls writing of data in and readout of data from the SSDs 116, the SASs 117, and the SATAs 118 according to a request received from the host server 103 or the like. The various programs for controlling the storage device 112 include at least a hierarchical pool management control program 114 and a volume shift executing program 115. The hierarchical pool management control program 114 provides the host server 103 or the like with a function for showing a storage region as a virtual logical volume. The SSDs 116, the SASs 117, and the SATAs 118 are plural storage device groups having different performances and may include storage device groups of types other than SSD, SAS, and SATA. The hierarchical pool management control program 114 has a function of receiving a command from the storage managing program 110 and creating a pool. The volume shift executing program 115 has a function of receiving a command from the storage managing program 110 and shifting a volume to the shift destination storage device 112.

<Concept of Logical Volume Shift or System Shift>

Figure 2:
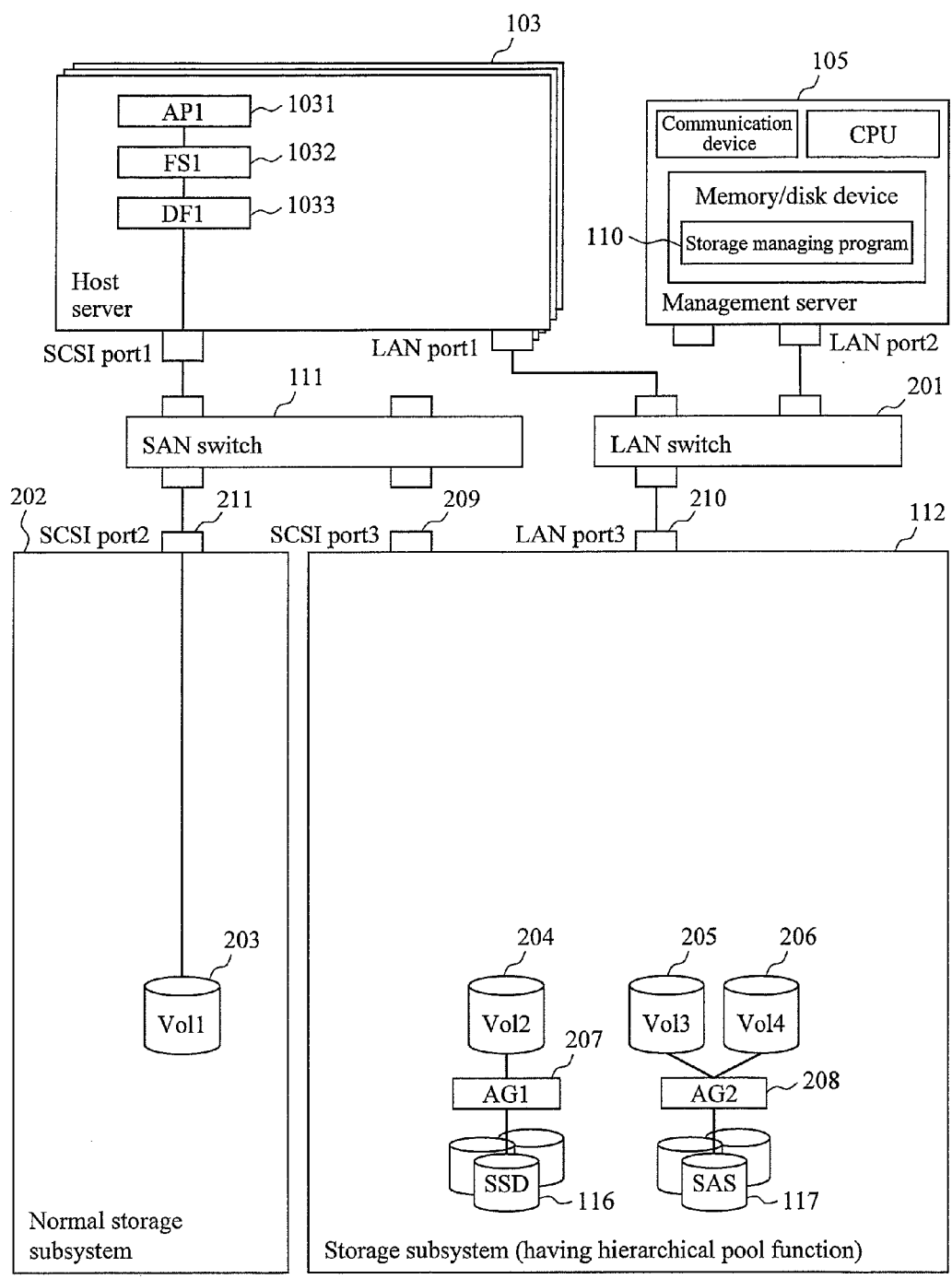
FIG. 2 is a diagram showing a specific example of the configuration of resources and a relation among the resources in an SAN environment before the application of a first embodiment of the present invention (before logical volume shift).
Figure 3:
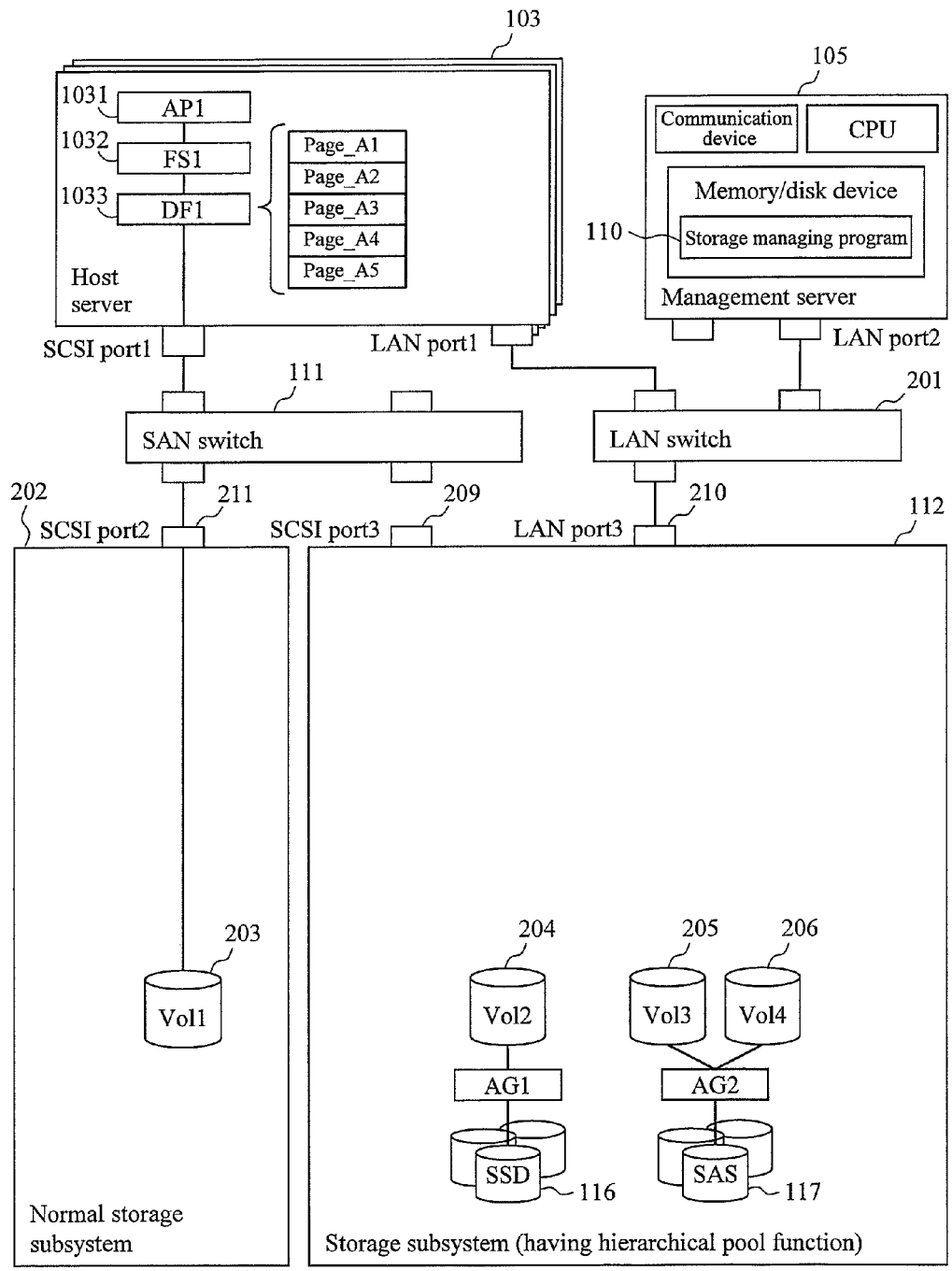
FIG. 3 is a diagram showing a specific example of the configuration of the resources and a relation among the resources in the SAN environment during the application of the first embodiment of the present invention (during the logical volume shift).
Figure 4:
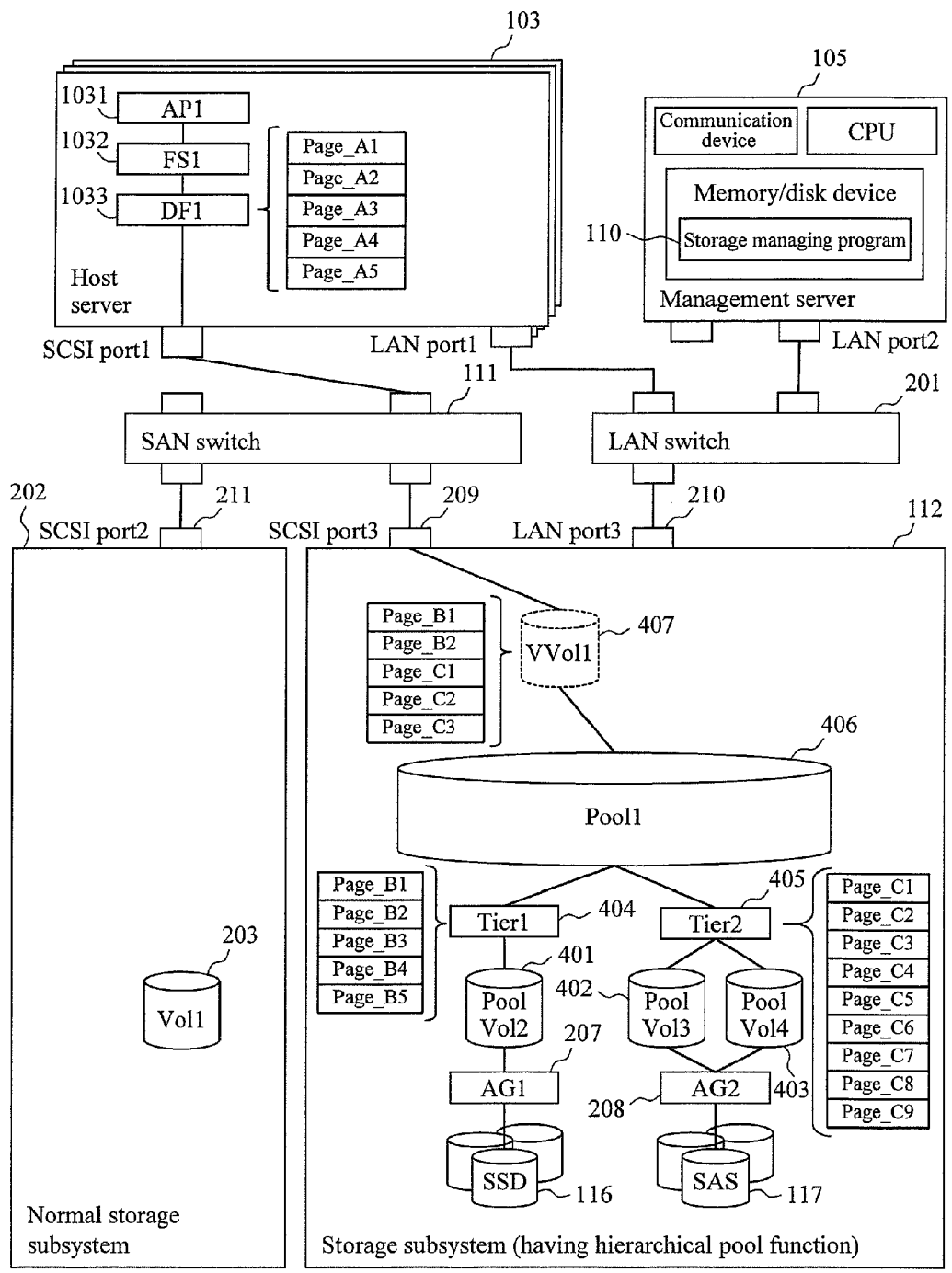
FIG. 4 is a diagram showing a specific example of the configuration of the resources and a relation among the resources in the SAN environment after the application of the first embodiment of the present invention (after the logical volume shift).

FIGS. 2 to 4 are diagrams showing relations of resources before shift, during shift, and after shift in shifting a logical volume in a normal storage device not having a hierarchical pool function to a storage device having the hierarchical pool function. FIG. 2 shows the relation before the shift, FIG. 3 shows the relation during the shift, and FIG. 4 shows the relation after the shift. The resource is a general term of hardware (a storage device, a host server, etc.) included in an SAN and physical or logical components (an array group, a logical volume, etc.) of the hardware and programs (job software 106, a database managing system, a file managing system, volume managing software, etc.) executed on the hardware and logical components (a file system, a logical device, etc.) of the programs.

(i) Resource Relation Before Shift

FIG. 2 is a diagram showing a specific example of the configuration of resources and a relation among the resources in an SAN environment before the application of the present invention (before logical volume shift).

In FIG. 2, hardware in the SAN environment includes the host server 103, the SAN switch 111, the management server 105 in which the storage managing program 110 for managing the SAN environment is present, the LAN switch 201, and storage devices 112 and 202. The management server 105 may be connected to the storage devices 112 and 202 by the SAN switch 111. The storage managing program 110 may be present on the storage device (the storage subsystem) 112.

In the host server 103, an application AP1_1031 is running. AP1_1031 is any one of plural applications included in the job software 106 shown in FIG. 1. In the host server 103, a file system FS1_1032 and a device file DF1_1033 are present. FS1_1032 and DF1_1033 are examples of resources set as targets of information acquisition by the host monitoring agent 108. The file system FS1_1032 is a unit for an OS (not shown) to provide an input and output service for data and has a function for systematically managing a storage region, which is an input destination of data. The device file DF1_1033 is a file managed by the OS as a region for storing a file in an external storage medium and used for device control. The device file functions as an interface of a device driver presented in a form of a normal file in a file system. With this device file, application software can use the device driver through an input and output system call and work is simplified.

As explained above, in the host server 103, for example, the application monitoring agent 107 for acquiring configuration information and performance information of the application AP1_1031 and the host monitoring agent 108 for acquiring configuration information and performance information of the file system FS1_1032 and the device file DF1_1033 are running.

Lines connecting the resources are shown in FIG. 2. These lines indicate that there is a dependency relation by an I/O request between two resources connected by the line. For example, the line connecting the application AP1_1031 and the file system FS1_1032 indicates a relation in which the application AP1_1031 issues the I/O request to the file system FS1_1032. The line connecting the file system FS1_1032 and the device file DF1_1033 indicates a relation in which an I/O load to the file system FS1_1032 is read or write of a device file DF1_1033.

In FIG. 2, it is indicated that, before logical volume shift, the device file DF1_1033 of the host server 103 is allocated to a volume Vol1_203 of a shift source storage device (the normal storage device not having the hierarchical pool function) 202. A correspondence relation between the device file 1033 and the volume 203 can be acquired from the host monitoring agent 108 or the like.

Although not shown in FIG. 2, in order to acquire configuration information and performance information of the shift destination storage device 112, the storage monitoring agent 109 is running Resources set as information acquisition targets by the storage monitoring agent 109 are at least a volume Vol2_204, a volume Vol3_205, a volume Vol4_206, an SCSI port 3_209, an array group AG1_207, an array group AG2_208, the storage media SSDs 116, and the SASs 117.

The array group AG1_207 is a high-speed and highly-reliable logical disk drive generated from plural storage media by a function of the CPU 119 of the shift destination storage device 112. The storage media include the SSDs 116 as semiconductor storage media and the SASs 117 and the SATAs 118 as hard disk devices. In this example, types of the storage medium are SSD, SAS, and SATA. However, the storage medium may be any one of the storage media and may be a combination of the storage media.

(ii) Resource Relation During Shift

FIG. 3 is a diagram showing a specific example of the configuration of the resources and a relation among the resources in the SAN environment during the application of the present invention (during the logical volume shift processing).

In FIG. 3, Page_A1 to Page_A5 are obtained by dividing a storage region of the device file DF1_1033 in a page size present in a virtual logical volume of a hierarchical pool. Before logical volume shift, the device file DF1_1033 is associated with the logical volume Vol1_203 and manages an I/O request of an application to and from the logical volume Vol1_203. Therefore, before the logical volume shift, the device file DF1_1033 manages, in an address unit, access information (access characteristics: information indicating an access load such as IOPS, a data transfer amount, and last access time) to the logical volume Vol1_203. When shift of data of the logical volume Vol1_203 is instructed, in order to realize an access to the volume with the virtual logical volume of the hierarchical pool, as explained above, the host monitoring agent 108 divides the storage region of the device file DF1_1033 in the page size and generates access information in a page unit. More specifically, the host monitoring agent 108 totalizes, for each of pages generated by dividing the storage region of the device file DF1_1033, information concerning an access load managed in an address unit to thereby acquire access information in the pages.

When the I/O request is cache-hit and does not reach the logical volume, a response time to the I/O request is shorter than basic response performance of a disk device. Therefore, in this case, the number of cache-hit I/O requests may be excluded from access information (the number of I/O requests) managed by a device file. This makes it possible to acquire information concerning the number of times of actual readout from and writing in the logical volume responding to the I/O request and accurately execute shift processing.

(iii) Resource Relation after Shift

FIG. 4 is a diagram showing a specific example of the configuration of the resources and a relation among the resources in the SAN environment after the application of the present invention (after the logical volume shift).

Pool volumes PoolVol2_401 to PoolVol4_403 are logical disk drives (actual logical volumes) which provide Pool1_403 with storage regions. The Pool volumes PoolVol2_401 to PoolVol4_403 correspond to the storage volumes Vol2_204 to Vol4_206.

Pool1_406 is a memory region for allocating a storage region to a virtual logical volume VVol1_407. Pool1_406 includes storage hierarchies Tier1_404 to Tier2_405. A pool exemplified by Pool1_406 provides the host server 103 with a virtual logical volume exemplified by VVol1_407. The pool includes plural types of storage media. The storage media provide a pool (e.g., Pool1_406) with pool volumes (e.g., PoolVol2_401 to PoolVol4_403), which are actual regions including divided regions of an array group (e.g., AG1_207 or AG2_208).

The virtual logical volume VVol1_407 is recognized as a logical disk drive by the host server 103 according to a virtual logical volume management control function of the storage device 112. However, unlike an actual logical volume, when the virtual logical volume VVol1_407 is created, a capacity is only defined and a storage region equivalent to the defined capacity is not secured. Thereafter, when a write request to a new address of VVol1_407 is generated, storage regions are allocated by a necessary amount. The storage regions allocated to the virtual logical volume are allocated in a unit called page. In the example shown in FIG. 4, Page_B1 to Page_B2 are allocated to VVol1_407 from Tier1_404. Page_C1 to Page_C3 are allocated to VVol1_407 from Tier2_405.

The storage hierarchies Tier1_404 to Tier2_405 are hierarchies of a logical storage medium created for each of types of storage media such as SSD and SAS. The storage hierarchies Tier1_404 to Tier2_405 include the plural pool volumes PoolVol2_401 to PoolVol4_403 sliced from the array groups AG1_207 to AG2_208 created for each of types of the storage media. As a specific example, Tier1_404 shown in FIG. 4 is an SSD, a storage hierarchy type of which is a semiconductor storage medium. Tier2_405 is an SAS, which is a hard disk device. Therefore, Tier1_404 has higher performance than Tier2_405. Storage hierarchies allocate data of a virtual logical volume from a pool volume in a unit called page.

Page_B1 to Page_B5 and Page_C1 to Page_C9 are units of storage regions for the storage hierarchies to allocate data to the virtual logical volume. In a virtual logical volume belonging to a pool having storage hierarchies like Pool1_406, allocation of storage regions are controlled such that, in a single pool, pages are arranged in a high-performance storage hierarchy in order from a page having access information (also referred to as free access characteristic; the access information includes access characteristics (as a representative access characteristic, the number of I/Os per unit time), a data transfer amount, last access time, etc.) relatively high compared with other pages. Conversely, a page having relatively low access information is arranged in a low-performance storage hierarchy.

In the arrangement of the pages, the storage managing program 110 acquires configuration information (storage hierarchy information and page information) of the storage device 112 and access information in a page unit from the storage device 112 via the storage monitoring agent 109 and performs arrangement of the pages according to the rules explained above.

In the example shown in FIG. 4, for example, when an access frequency to a page Page_C2 currently used for the virtual logical volume VVol1_407 substantially increases, rearrangement of the pages for allocating Page_B3 of Tier1_404 to VVol1_407 is performed.

Since other resources are the same as those shown in FIG. 2, explanation of the resources is omitted.

<Functions of the Storage Managing Program>

Figure 5:
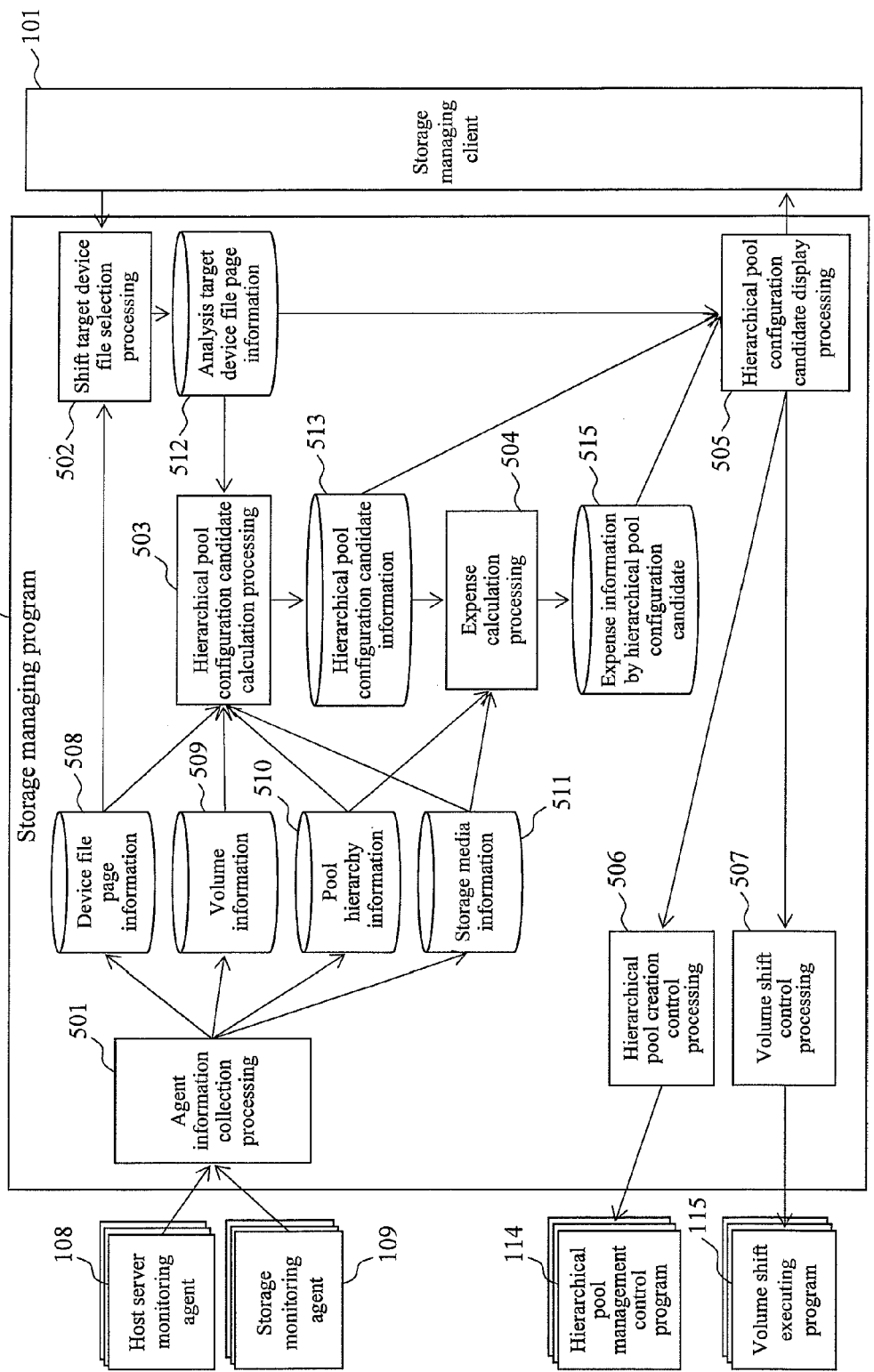
FIG. 5 is a block diagram for explaining functions of a storage managing program 110.

FIG. 5 is a block diagram for explaining functions of the storage managing program 110. Details of processing by the functions are explained with reference to flowcharts and GUI screen examples (FIGS. 13 to 21) explained later.

The storage managing program 110 executes agent information collection processing 501, shift target device file selection processing 502, hierarchical pool configuration candidate calculation processing 503, expense calculation processing 504, hierarchical pool configuration candidate display processing 505, hierarchical pool creation control processing 506, and volume shift control processing 507. The respective kinds of processing can also be realized as program modules included in the storage managing program 110.

The storage managing program 110 starts and executes the agent information collection processing 501 at predetermined timing (e.g., according to scheduling configuration, periodically, or according to an instruction by a user using the storage managing client 101 or an instruction from other processing), receives configuration/capacity information, performance information, and access information of devices, agents (programs), and components in the SAN environment collected by the application monitoring agent 107, the host monitoring agent 108, and the storage monitoring agent 109, and stores the information as device file page information 508, volume information 509, pool hierarchy information 510, and storage media information 511. A resource is a general term of hardware (the storage device 112, the host server 103, etc.) included in the SAN environment and physical or logical components (a parity group, a logical volume, etc.) of the hardware and programs (job software, a database managing system, a file managing system, volume managing software, etc.) executed on the hardware and logical components (a file system, a logical device, etc.) of the programs.

The storage managing program 110 searches through the device file page information 508 using a device file to be shifted, which is designated by the storage managing client 101, as a key to thereby execute the shift target device file selection processing 502, specifies page information of the device file to be shifted, and stores the page information as analysis target device file page information 512.

The storage managing program 110 acquires, with reference to the device file page information 508, the volume information 509, the pool hierarchy information 510, and the storage media information 511 acquired by the agent information collection processing 501, information necessary in processing device file page information to be analyzed, executes the hierarchical pool configuration candidate calculation processing 503 and, when the shift target device file is shifted to a virtual logical volume, calculates a hierarchical pool configuration which satisfies response performance of the shift target device file. The storage managing program 110 stores a calculation result as hierarchical pool configuration candidate information 513.

The storage managing program 110 executes, concerning candidates indicated by the hierarchical pool configuration candidate information 513, expense calculation processing 504 using the pool hierarchy information 510 and the storage media information 511, calculates expenses in configuring the logical volume to be analyzed with a virtual logical volume of a hierarchical pool, and stores a result of the calculation as expense information by hierarchical pool configuration candidate 515.

Further, the storage managing program 110 executes the hierarchical pool configuration candidate display processing 505 using device file information to be analyzed included in the analysis target device file page information 512, the hierarchical pool configuration candidate information 513, and the expense information by hierarchical configuration candidate 515, generates information concerning a hierarchical pool configuration candidate display screen (GUI), and displays the information on, for example, a display screen of the storage managing client 101.

When an administrator (a user) instructs hierarchical pool creation using the hierarchical pool configuration candidate display screen (GUI), the storage managing program 110 generates a pool creation request according to the hierarchical pool creation control processing 506 and instructs the hierarchical pool management control program 114 of the storage device 112 to create a pool. When the administrator (the user) instructs shift of a volume using the hierarchical pool configuration candidate display screen (GUI), the storage managing program 110 generates a volume shift request according to the volume shift control processing 507 and instructs the volume shift executing program 115 of the storage device 112 to execute volume shift.

The device file page information 508 is access information in a page unit acquired by the agent information collection processing 501 and managed in a device file of the host server 103.

The volume information 509 is information such as a capacity of logical volumes (e.g., Vol2_204 to Vol4_206) and a configuration storage medium type of the storage device 112 acquired by the agent information collection processing 501.

The pool hierarchy information 510 is information concerning hierarchies included in a pool (e.g., Pool1_406) of the storage device 112 acquired by the agent information collection processing 501.

The storage media information 511 is information indicating basic response performance and a capacity unit price of storage media included in hierarchies acquired by the agent information collection processing 501.

Details of the various kinds of information 508 to 515 are explained later with reference to FIGS. 6 to 12.

<Configuration Example of Various Kinds of Information>

FIGS. 6 to 12 are diagrams showing configuration examples of the various kinds of information used by the storage managing program 110. In order to explain the information, a table format is adopted. However, a form of the information is not limited. Any form may be adopted as long as the form is a structure in which a relation of configuration items can be grasped.

(i) Page Performance Information (Table)

FIG. 6 is a diagram showing a configuration example of the device file page information 508. The device file page information 508 includes a page identifier 601, a device file identifier 602, a host identifier 603, and access information 604 as configuration items. As explained above, the storage monitoring agent 109 collects information included in the device file page information 600 and the storage managing program 110 acquires, according to the agent information collection processing 501, values collected by the host monitoring agent 108.

The page identifier 601 is information for uniquely specifying and identifying a unit of a region managed by a device file, which is a storage region generated by dividing a storage region of the device file by a page capacity of a virtual logical volume. Pages managed by the device file correspond to pages of hierarchies allocated to the virtual logical volume.

The device file identifier 602 is information for uniquely specifying and identifying a device file to which a page region corresponding thereto belongs.

The host identifier 603 is information for uniquely specifying and identifying a host server to which a device file corresponding thereto belongs.

The access information 604 is information indicating access information (e.g., IOPS) corresponding to a relevant page managed on the device file. This information is a measured value obtained at a point when the agent information collection processing 501 is executed. Therefore, when it is only checked how much expenses are required if a device file is simply shifted without executing volume shift (expense calculation processing is only executed to display a result of the expense calculation processing on a GUI) and device file page information is acquired in the next opportunity, in some case, a value of the information changes. A measured value at that point measured periodically may be written in the table or an average of values from the last table writing to the present measurement may be written.

(ii) Volume Information (Table)

FIG. 7 is a diagram showing a configuration example of the volume information 509. The volume information 509 includes a volume (logical volume) identifier 701, a storage device identifier 702, a capacity 703, and a storage media type 704 as configuration items. The storage monitoring agent 109 collects, for each of logical volumes, a storage device identifier of a storage device to which the logical volume belongs, a capacity of the volume, and a type of a storage medium to which the logical volume belongs. The storage managing program 110 acquires, according to the agent information collection processing 501, values collected by the storage monitoring agent 109.

The volume identifier 701 is information for uniquely specifying and identifying logical volumes (e.g., pool volumes 401 to 404) set in the storage device 112 having the hierarchical pool function.

The storage device identifier 702 is information for uniquely specifying and identifying the storage device (the shift destination storage device) 112 having the hierarchical pool function to which a logical volume corresponding thereto belongs.

The capacity 703 is information indicating a capacity of a logical volume corresponding thereto.

The storage media type 704 is information indicating a type of a storage device included in the corresponding logical volume.

(iii) Pool Hierarchy Information (Table)

Figure 8:
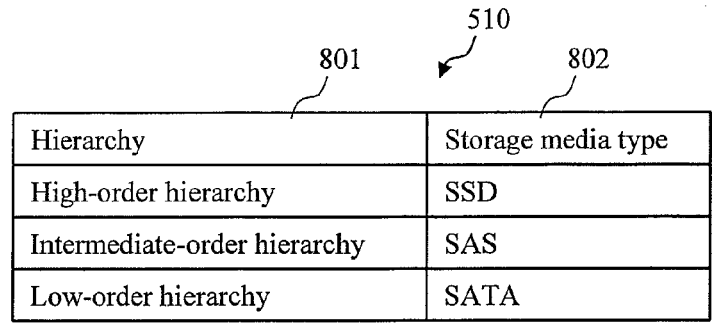
FIG. 8 is a diagram showing a configuration example of pool hierarchy information 510.

FIG. 8 is a diagram showing a configuration example of the pool hierarchy information 510. The pool hierarchy information 510 includes a hierarchy 801 and a storage media type 802 as configuration items.

The hierarchy 801 is information indicating in which hierarchy (Tier) a storage device corresponding thereto is included in the storage device (the shift destination storage device) 112 having the hierarchical pool function. In this embodiment, as an example, hierarchies are three layers of high-order, intermediate-order, and low-order layers. However, the hierarchies are not limited to this and may be two layers or a larger number of layers may be set.

The storage media type 802 is information indicating types of storage devices included in the hierarchies. SSD, SAS, and SATA are shown. However, the storage devices are not limited to these types and may be storage devices of other types.

(iv) Storage Media Information (Table)

Figure 9:
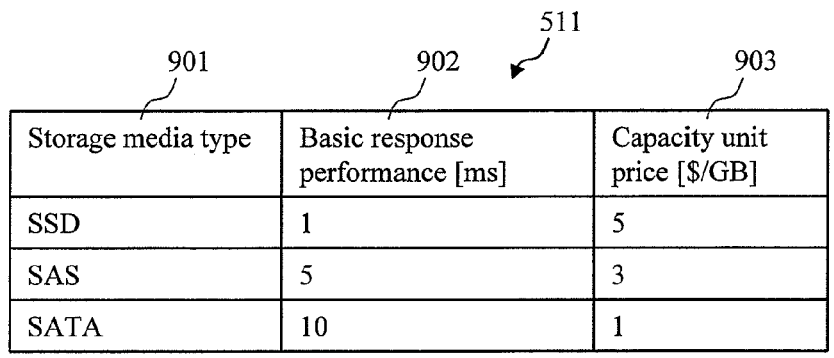
FIG. 9 is information showing a configuration example of storage media information 511.

FIG. 9 is information showing a configuration example of the storage media information 511. It is possible to learn basic response performances (design values) and capacity unit prices per GB of the storage devices from the storage media information 511.

The storage media information 511 includes a storage media type 901, basic response performance 902, and a capacity unit price 903 as configuration items. The storage monitoring agent 109 collects basic response performance and a capacity unit price for each of the storage device types. The storage managing program 110 acquires, according to the agent information collection processing 501, values collected by the storage monitoring agent 109. It is not always necessary to execute the agent information collection processing 501 to acquire these kinds of information. For example, when the storage system 100 is built, the storage medium information 511 may be acquired from basic information of storage devices set in the system and store the storage media information 511 in the system in advance.

The storage media type 901 is information indicating types of storage devices included in hierarchies. SSD, SAS, and SATA are shown. However, the storage devices are not limited to these types and may be storage devices of other types.

The basic response performance 902 is information indicating values of basic response performance set in the storage devices included in the hierarchies, i.e., time until a response is output after an I/O request is received.

The capacity unit price is information indicating prices per 1 GB (an example) of the storage devices included in the hierarchies.

(v) Analysis Target Device File Page Information (Table)

Figure 10:
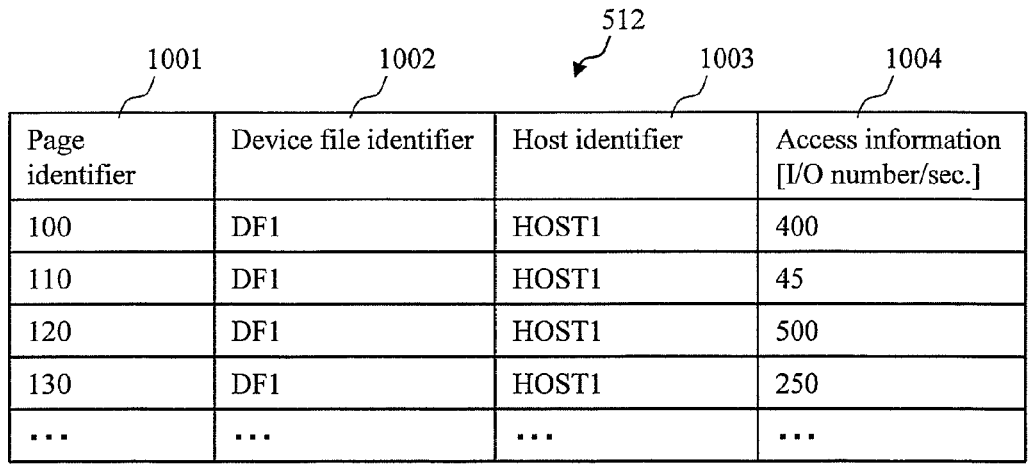
FIG. 10 is a diagram showing a configuration example of analysis target device file page information 512.

FIG. 10 is a diagram showing a configuration example of the analysis target device file page information 512. The analysis target device file page information 512 is information concerning a device file extracted out of the device file page information 508 according to the shift target device file selection processing 502.

Like the device file page information 508, the analysis target device file page information 512 includes a page identifier 1001, a device file identifier 1002, a host identifier 1003, and access information 1004 as configuration items.

In the analysis target device file page information 512, the page identifier 1001 is information for uniquely specifying and identifying a page managed by a device file (e.g., a device file DF1) designated by the user (the administrator) via the storage managing client 101.

The device file identifier 1002 is information for uniquely specifying and identifying a device file designated by the user. In this embodiment, an example in which only one device file is designated is explained. However, plural device files may be designated and pages managed by the device files may be shifted to one virtual logical volume.

The host identifier 1003 is information for uniquely specifying and identifying the host server 103 to which a device file designated as an analysis target belongs.

The access information 1004 is information indicating access information concerning pages managed by the device file designated as the analysis target.

(vi) Hierarchical Pool Configuration Candidate Information (Table)

FIG. 11 is a diagram showing a configuration example of the hierarchical pool configuration candidate information 513. The hierarchical pool configuration candidate information 513 is information indicating a result of the hierarchical pool configuration candidate calculation processing 503.

The hierarchical pool configuration candidate information 513 includes a candidate identifier 1101, a high-order hierarchy capacity 1102, an intermediate-order hierarchy capacity 1103, a low-order hierarchy capacity 1104, a high-order hierarchy boundary value 1105, and an intermediate-order hierarchy boundary value 1106 as configuration items.

The candidate identifier 1101 is information for specifying and identifying a candidate of a combination of storage regions from hierarchies which can be acquired when pages of a device file to be analyzed are shifted to a virtual logical volume. As a result of executing the hierarchical pool configuration candidate calculation processing 503, in some case, plural candidates are calculated. This candidate identifier 1101 is information used for identifying the candidates.

The high-order hierarchy capacity 1102, the intermediate-order hierarchy capacity 1103, and the low-order hierarchy capacity 1104 are information indicating combinations of capacities of the hierarchies in candidates corresponding thereto obtained by executing the hierarchical pool configuration candidate calculation processing 503.

The high-order hierarchy boundary value 1105 indicates a value of access information to a page which is a determination reference in distributing pages managed by a device file to a high-order hierarchy and an intermediate-order hierarchy in the candidates. The intermediate-order hierarchy boundary value 1106 indicates a value of access information to a page which is a determination reference in distributing the pages managed by the device file to the intermediate-order hierarchy and a low-order hierarchy in the candidates. In FIG. 11, it is seen that, in a plan 1, a storage region is allocated from the high-order hierarchy to a page including access information (IOPSs) equal to or more than 350, a storage region is allocated form the intermediate-order hierarchy to a page including access information (IOPSs) equal to or more than 60 and less than 350, and a storage region is allocated from the low-order hierarchy to a page including access information less than 60.

(vii) Hierarchical Pool Configuration Candidate Expense Information (Table)

FIG. 12 is a diagram showing a configuration example of the hierarchical pool configuration candidate expense information 515. The hierarchical pool configuration candidate expense information 515 is a result of the expense calculation processing 504.

The hierarchical pool configuration candidate expense information 515 includes a candidate identifier 1201 and an expense 1202 as configuration items.

The candidate identifier 1201 is information for uniquely specifying and identifying a hierarchical pool configuration for which expenses are calculated corresponding to the candidate identifier 1101 of the hierarchical pool configuration candidate information 513.

The expense 1202 is information indicating storage cost calculated on the basis of the hierarchical pool configuration candidate information 513 and the capacity unit prices 903 of the hierarchies.

<Overview of the Logical Volume Shift Processing>

Figure 13:
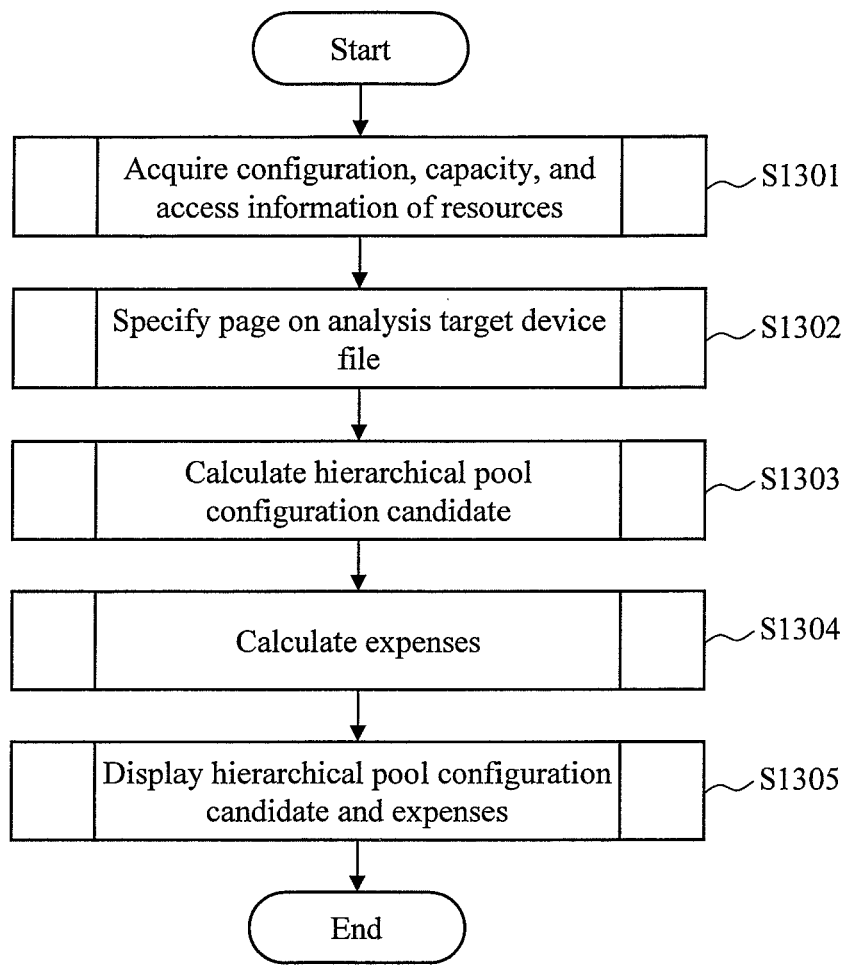
FIG. 13 is a flowchart for explaining an overview of processing for shifting a logical volume from a normal storage device (a shift source storage device) to a storage device having a hierarchical pool function (a shift destination storage device).

FIG. 13 is a flowchart for explaining an overview of processing for shifting a logical volume from the normal storage device to the storage device (the shift destination storage device) 112 having the hierarchical pool function.

In S1301, the storage managing program 110 executes the agent information collection processing 501 and acquires configuration information of the shift destination storage device 112, capacities and configuration information of pool volumes in the shift destination storage device 112, and configuration information and access information of pages of device files present in the host server 103. Details of S1301 are explained later with reference to FIG. 14.

In S1302, the storage managing program 110 executes the shift target device file selection processing 502 and specifies a page on a device file to be analyzed. Details of S1302 are explained later with reference to FIG. 15.

In S1303, the storage managing program 110 executes the hierarchical pool configuration candidate calculation processing 503 and calculates at least one candidate of a hierarchical pool configuration. Details of S1303 are explained later with reference to FIG. 17.

In S1304, the storage managing program 110 executes the expense calculation processing 504 and calculates expenses in realizing the hierarchical pool configurations calculated in S1303 (storage management cost). Details of S1304 are explained later with reference to FIG. 19.

In S1305, the storage managing program 110 executes the hierarchical pool configuration candidate display processing 505, generates a GUI concerning information concerning the hierarchical pool configuration candidates obtained in S1303 and expenses for realizing the hierarchical pool configuration candidates, and displays the GUI on, for example, the display screen of the storage managing client 101. Details of S1305 are explained later with reference to FIG. 20.

According to the processing explained above, a pool configuration, storage capacities allocated form the storage devices in the hierarchies, and expenses in shifting a logical volume present in the normal storage device not having the hierarchical pool function to the storage device 112 having the hierarchical pool function are presented to the user (the administrator). The user can actually instruct shift of the logical volume on the basis of the displayed information or can select operation for not shifting the logical volume if shift cost exceeding an estimated budget seems to be required.

<Details of the Agent Information Collection Processing (S1301)

Figure 14:
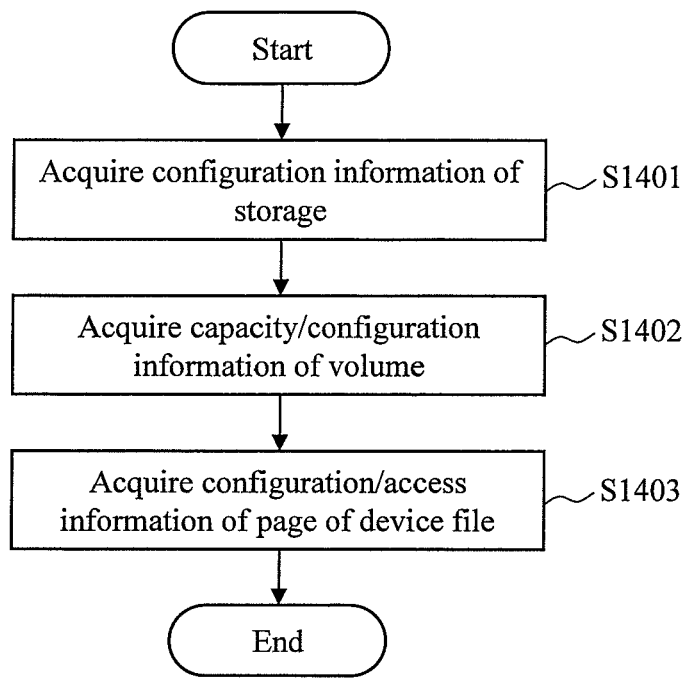
FIG. 14 is a flowchart for explaining details of agent information collection processing 501 (S1301).

FIG. 14 is a flowchart for explaining details of the agent information collection processing 501 (S1301).

In S1401, the storage managing program 110 acquires configuration information of the shift destination storage device 112 via the storage managing agent 109. Information acquired in S1401 is information concerning the storage devices included in the hierarchies and information concerning storage media included in the hierarchies in the storage device 112. The former is stored in the pool hierarchy information table 510 shown in FIG. 8. The latter is stored in the storage media information table 511 shown in FIG. 9. Types of the storage media included in the hierarchies and information concerning basic response performances and capacity unit prices of the storage media are acquired in the step. As explained above, the storage monitoring agent 109 collects information from the storage device 112 at predetermined timing (e.g., timing of scheduling configuration or periodical timer configuration) or acquires a configuration, a capacity, performance information, and the like in response to a request from the storage managing program 110.

In S1402, the storage managing program 110 acquires information concerning logical volumes included in the shift destination storage device 112 from the storage monitoring agent 109 and stores the information in the volume information table 509. Consequently, capacities of logical volumes (e.g., Vol2_204 to Vol4_206) and information concerning types of the storage media included in the hierarchies are obtained.

In S1403, the storage managing program 110 acquires the configuration of pages of the device file present in the host server 103 and access information to the pages and stores the configuration and the access information in the device file page information table 508 (see FIG. 1). As explained above, the host server managing agent 108 divides access information (e.g., IOPSs, data transfer amounts, or last access times) to addresses of logical volumes present in the normal storage device (a shift source storage device) managed by device files present in host servers into regions in a page unit to thereby grasp access information to the pages and mange the information. Concerning acquisition of this information, like the storage monitoring agent 109, the host server managing agent 108 acquires access information to the pages from the device files at predetermined timing (e.g., timing of scheduling configuration or periodical timer configuration) or acquires the access information in response to a request from the storage managing program 110.

<Details of the Shift Target Device File Selection Processing (S1302)>

Figure 15:
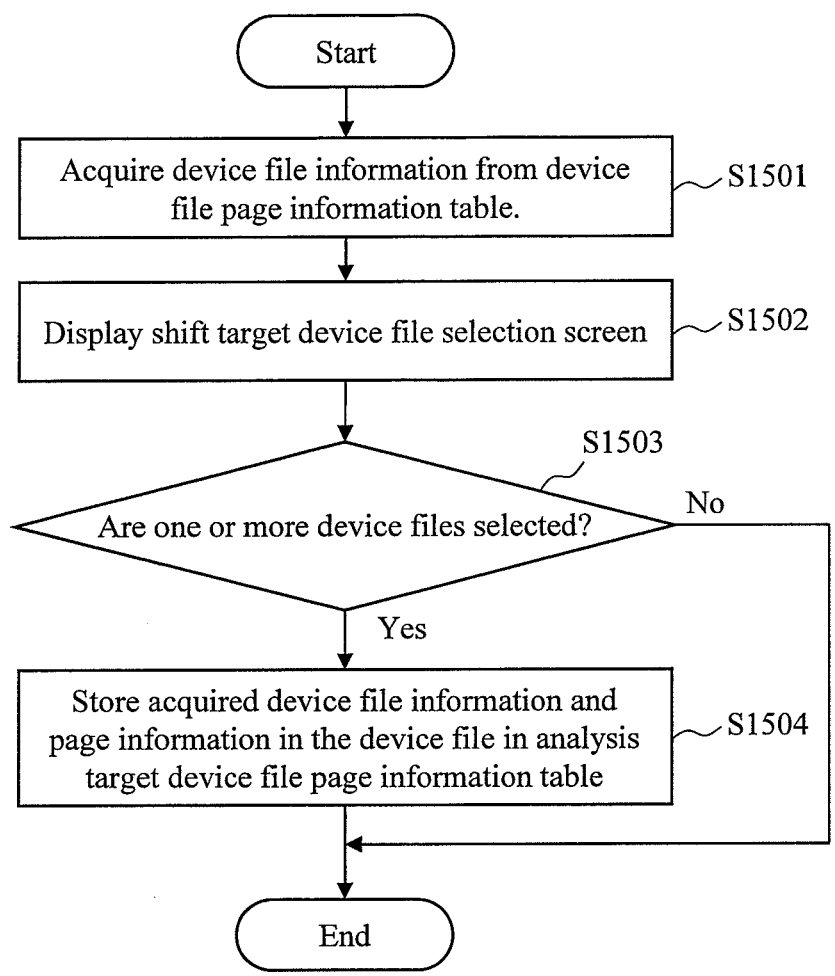
FIG. 15 is a flowchart for explaining details of shift target device file selection processing 502 (S1302).

FIG. 15 is a flowchart for explaining details of the shift target device file selection processing 502 (S1302).

In S1501, the storage managing program 110 acquires device file information from the device file page information (table) 508 (see FIG. 1) acquired in S1301.

In S1502, the storage managing program 110 generates a shift target device file selection screen (GUI) using the device file information acquired in S1501 and displays the shift target device file selection screen (GUI) on the display screen of the storage managing client 101. The shift target device file selection screen has a configuration shown in FIG. 16. Details are explained later.

In S1503, the storage managing program 110 determines whether the user (the administrator) selects one or more device files using the shift target device file selection screen. When the device files are not selected (No in S1503), the storage managing program 110 ends the shift target device file selection processing. When a device file to be shifted is not selected, the shift processing for the logical volumes (the entire processing shown in FIG. 13) may be ended. When one or more device files are selected (Yes in S1503), the processing shifts to S1504.

In S1504, the storage managing program 110 acquires page information included in the selected device file and access information to pages from the device file page information (table) 508 and stores the page information and the access information in the analysis target device file page information (table) 512 (see FIG. 10).

According to the processing explained above, a page to be shifted and access information to the page are specified.

<Example of the Shift Target Device File Selection Screen>

Figure 16:
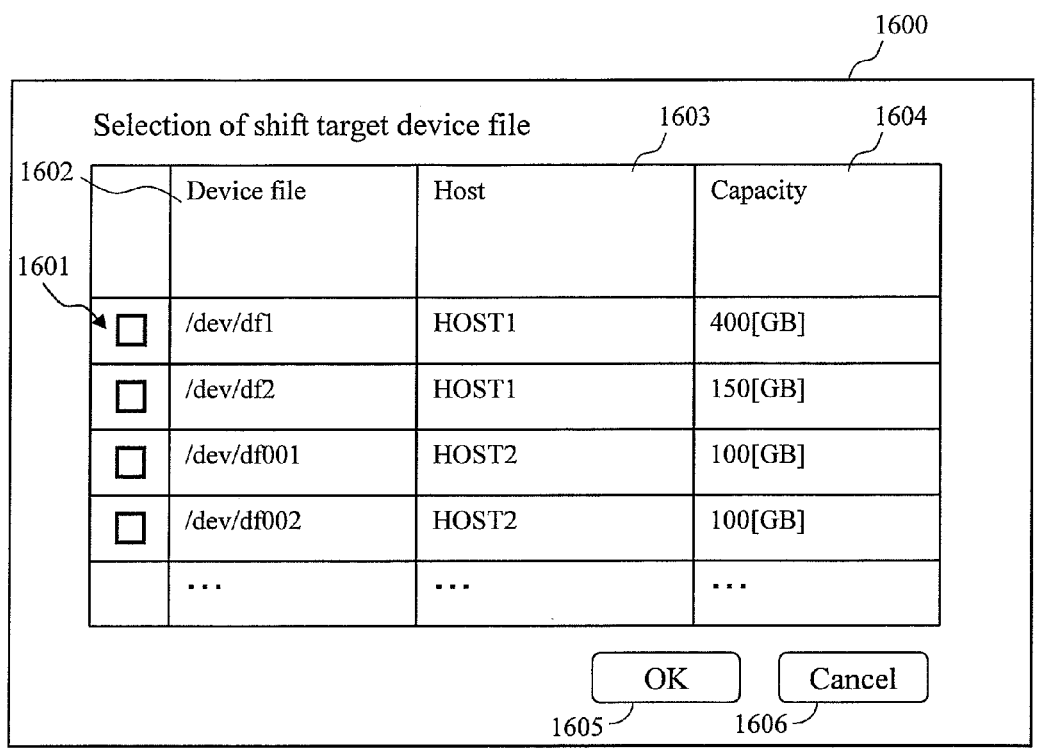
FIG. 16 is a diagram showing a configuration example of a shift target device file selection screen 1600.

FIG. 16 is a diagram showing a configuration example of a shift target device file selection screen 1600. The shift target device file selection screen 1600 includes, as configuration items, a selection space 1601 in which the user can select and designate a shift target by checking a box, a device file space 1602 indicating a device file name to be selected, a host space 1603 indicating a host server name to which a device file corresponding thereto belongs, a capacity space 1604 indicating a capacity of a logical volume managed by a device file corresponding thereto, an OK button 1605 for instructing selection completion, and a cancel button 1606 for cancelling selection or ending the shift target device file selection processing.

In the present invention, for example, when one device file is selected, one virtual logical volume is generated in the shift destination storage device 112 concerning a logical volume managed in the device file. When two device files are selected, two virtual logical volumes may be generated or one virtual logical volume may be generated concerning two logical volumes respectively managed by the two device files.

<Details of the Hierarchical Pool Configuration Candidate Calculation Processing (S1303)>

Figure 17:
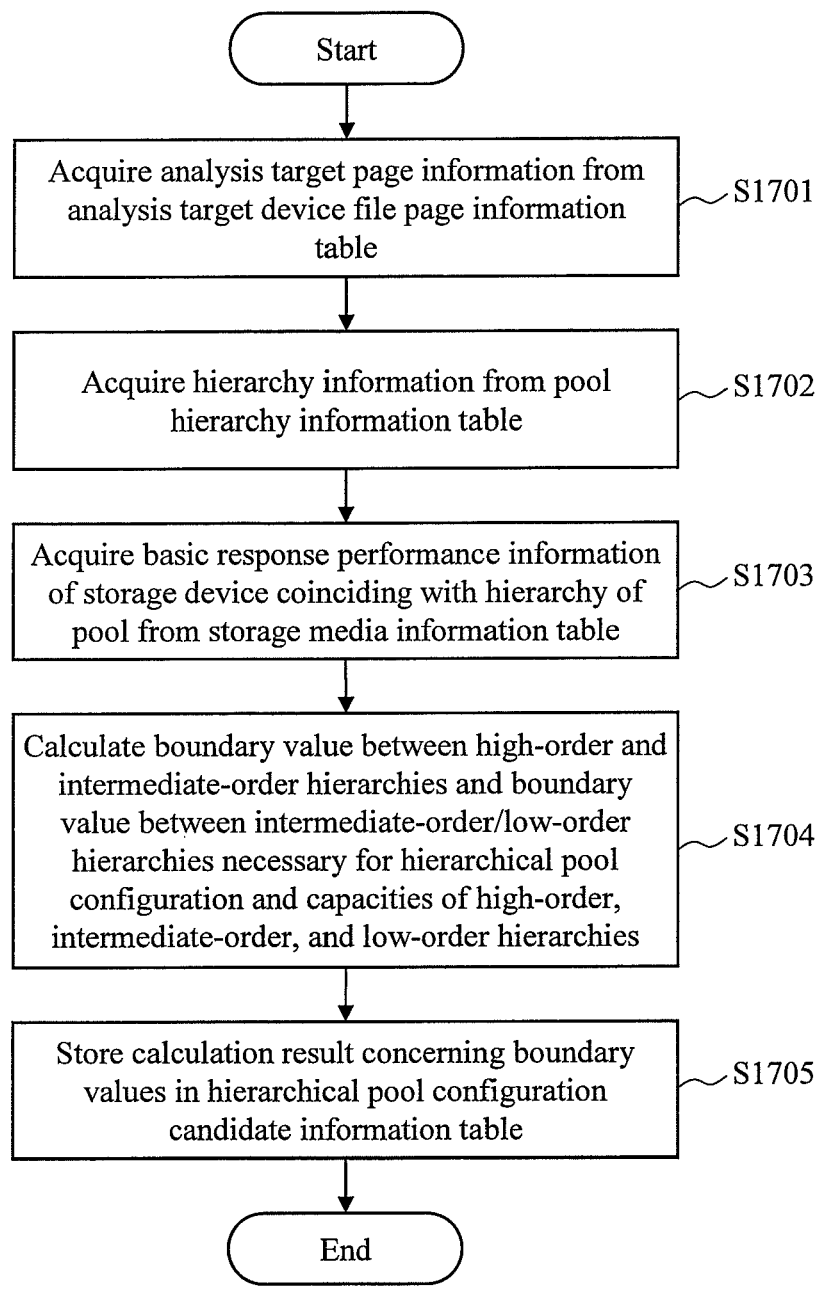
FIG. 17 is a flowchart for explaining details of hierarchical pool configuration candidate calculation processing 503 (S1303).

FIG. 17 is a flowchart for explaining details of the hierarchical pool configuration candidate calculation processing 503 (S1303).

In S1701, the storage managing program 110 acquires page information to be analyzed from the analysis target device file page information (table) 512 acquired in S1302. More specifically, information acquired in S1701 is a page identifier and access information to pages.

In S1702, the storage managing program 110 acquires hierarchy information from the pool hierarchy configuration information (table) 510 (see FIG. 8).

In S1703, the storage managing program 110 acquires, from the storage media information (table) 511 (see FIG. 9), basic response performance information of a storage device coinciding with the hierarchy information acquired in S1702.

In S1704, the storage managing program 110 calculates a boundary value between a high-order hierarchy and an intermediate-order hierarchy and a boundary value between the intermediate-order hierarchy and a low-order hierarchy necessary for a hierarchical pool configuration and capacities of the hierarchies necessary for configuring a virtual logical volume. For example, when storage regions are allocated from the high-order hierarchy to pages in order from a page having a highest TOPS, the boundary values are, for example, set in advance. Storage regions are respectively allocated from the high-order hierarchy and the intermediate-order hierarchy to pages respectively having IOPSs exceeding the boundary values. Storage regions are allocated from the low-order hierarchy to all pages having IOPSs lower than the boundary value between the intermediate-order hierarchy and the low-order hierarchy. If capacities of the hierarchies allocated to the respective pages are totaled, capacities allocated from the hierarchies are calculated. On the other hand, a hierarchical pool configuration candidate can also be calculated taking into account target response performance. Processing in this case is explained later using a specific example (see FIG. 18).

In S1705, the storage managing program 110 stores information concerning the necessary capacities of the hierarchies and the boundary values among the hierarchies acquired in S1704 in the hierarchical pool configuration candidate information (table) 513 (see FIG. 11) as a hierarchical pool configuration candidate.

<Calculation of a Hierarchical Pool Configuration Candidate Taking into Account Target Response Performance>

Figure 18:
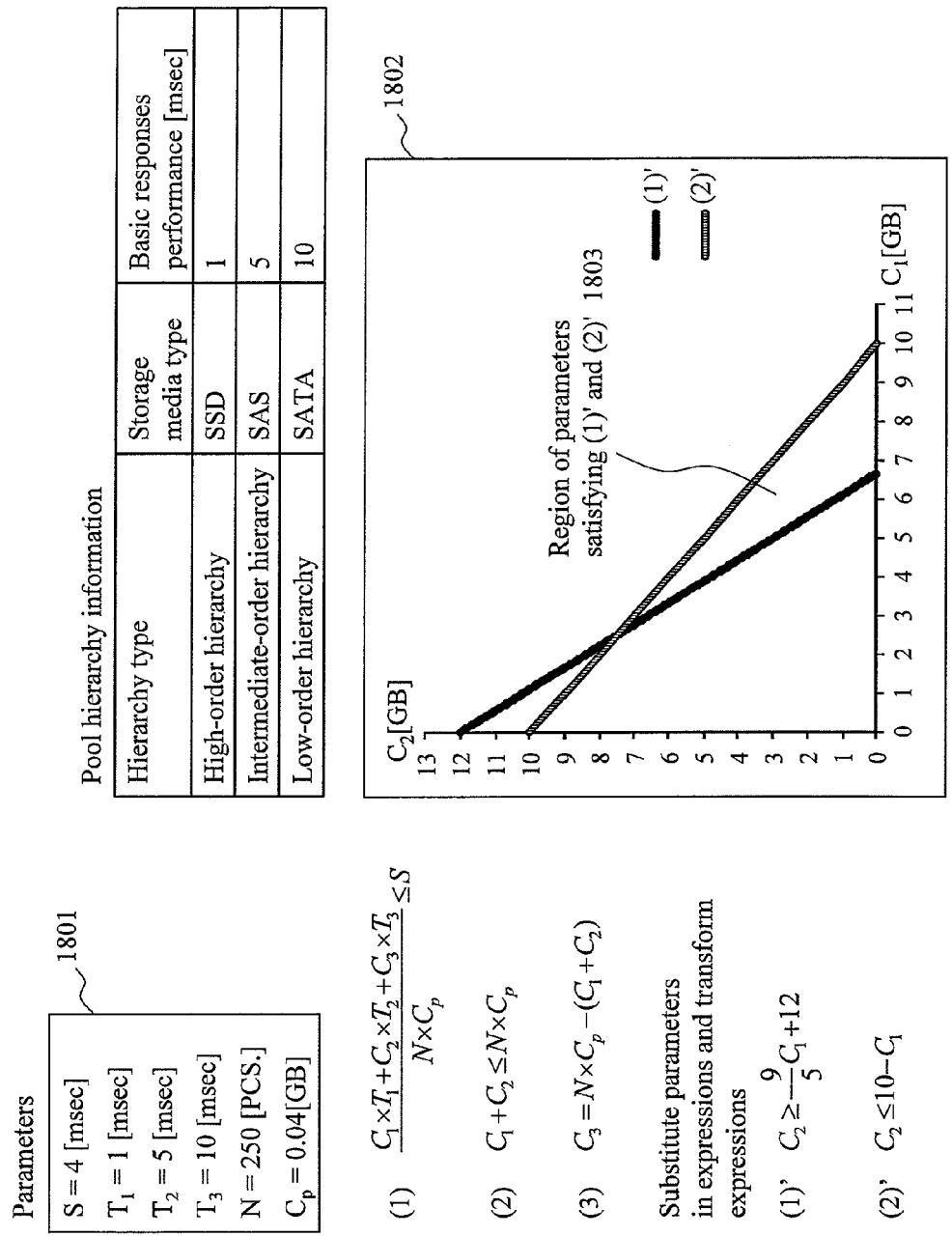
FIG. 18 is a diagram for explaining a calculation example of a hierarchical pool configuration candidate in which target response performance is taken into account.

FIG. 18 is a diagram for explaining a calculation example of a hierarchical pool configuration candidate taking into account target response performance. Although not shown in FIG. 2, in this embodiment, the user (the administrator) can set, using the storage managing client 101, target response performance of a virtual logical volume which uses a hierarchical pool to be generated. In other words, in this embodiment, allocation of storage regions to pages is executed to satisfy set target response performance.

The storage managing program 110 calculates the numbers of pages of storage devices in high-order, intermediate-order, and low-order hierarchies necessary for satisfying the set target response performance. The storage managing program 110 calculates the numbers of pages by calculating parameters ($C_1$, $C_2$, $C_3$) which satisfy the following expressions. Since plural parameters which satisfy the following expressions (1) to (3) are present plural combinations of the parameters are candidates of a hierarchical pool configuration. The user can select, concerning all the combinations, a candidate with minimum cost obtained by expense calculation processing explained later. To further facilitate understanding, a specific example of the calculation of the parameters ($C_1$, $C_2$, $C_3$) is explained later (see FIG. 18).

$$\frac{C_1 \times T_1 + C_2 \times T_2 + C_3 \times T_3}{N \times C_p} \leq S \quad (1)$$

$$C_1 + C_2 \leq N \times C_p \quad (2)$$

$$C_3 = N \times C_p - (C_1 + C_2) \quad (3)$$

The respective parameters have meanings explained below.

S=Target response performance [msec] of the virtual logical volume: input by the user $T_1$=Basic response performance [msec] of the high-order hierarchy: acquired in S1703

$T_2$=Basic response performance [msec] of the intermediate-order hierarchy: acquired in S1703

$T_3$=Basic response performance [msec] of the low-order hierarchy: acquired in S1703

N=Total number of pages include in a device file to be shifted: acquired from the device file $C_P$=Capacity [GB] per one page: known (set value)

$C_1$=Capacity [GB] of a storage device in the high-order hierarchy necessary for the virtual logical volume to satisfy a corrected target response performance: calculation target $C_2$=Capacity [GB] of a storage device in the intermediate-order hierarchy necessary for the virtual logical volume to satisfy the corrected target response performance: calculation target $C_3$=Capacity [GB] of a storage device in the low-order hierarchy necessary for the virtual logical volume to satisfy the corrected target response performance: calculation target A specific example of the calculation of the parameters ($C_1$, $C_2$, $C_3$) is as explained below. FIG. 18 is a diagram for explaining a specific example in which the numbers of pages of the hierarchies necessary for the virtual logical volume to satisfy the target response performance are calculated.

As explained above, if the parameters ($C_1$, $C_2$, $C_3$) are calculated, the numbers of pages corresponding to $C_1$, $C_2$, and $C_3$ are calculated by dividing the parameters ($C_1$, $C_2$, $C_3$) by the capacity $C_P$ per one page.

Parameters 2801 are assumed to be S=4 (msec), $T_1$=1 (msec), $T_2$=5(msec), $T_3$=10(msec), N=250, $C_P$=0.04(GB).

When the specific parameters values are substituted in the expressions (see Expressions (1) to (3) in FIG. 18) to transform the expressions $$C_2 \geq -\frac{9}{5}C_1 + 12 \qquad (1)'$$

$$C_2 \leq 10 - C_1 \qquad (2)'$$

are obtained.

Therefore, a combination of parameters ($C_0, C_1, C_2$) which satisfy Expressions (1)' and (2)' is a hierarchical pool configuration candidate (parameters included in a region 1803 shown in FIG. 18). If a parameter with lowest cost in a region which satisfies Expressions (1)' and (2)' (a range indicated by the region 1803 of a graph 1802 shown in FIG. 18) is selected, it is possible to efficiently operate the storage device at minimum cost.

A list of analysis target pages on the device file is acquired from the analysis target device file page information (table) 508 (see FIG. 6). The analysis target pages are sorted in order from one having a largest access frequency in the list.

Subsequently, a capacity evaluation is performed using Expression (4) to acquire, at a point when the number of pages reaches the number of pages equivalent to a capacity of $C_1$, access information of added-up pages. This access information is a boundary value of access information between the high-order hierarchy and the intermediate-order hierarchy.

$$\Sigma(\text{number of pages from the top of the page information list}) \geq (\text{number of pages equivalent to the capacity of } C_1) \qquad (4)$$

Similarly, another capacity evaluation is performed using Expression (F5) to acquire, at a point when the number of pages reaches the number of pages equivalent to a capacity of $C_1+C_2$, access information of added-up pages. This access information is a boundary value of access information between the intermediate-order hierarchy and the low-order hierarchy.

$$\Sigma(\text{number of pages from the top of the page information list}) \geq (\text{number of pages equivalent to the capacity of } C_1+C_2) \qquad (5)$$

A capacity from the boundary value between the intermediate-order hierarchy and the low-order hierarchy calculated by Expression (5) to the end of the analysis target page list is equivalent to $C_3$.

The access information (the boundary values among the hierarchies) of the pages and the capacity information of the hierarchies calculated as explained above are stored in the hierarchical pool configuration candidate information (table) 513 (see FIG. 11).

<Details of the Expense Calculation Processing (S1304)>

Figure 19:
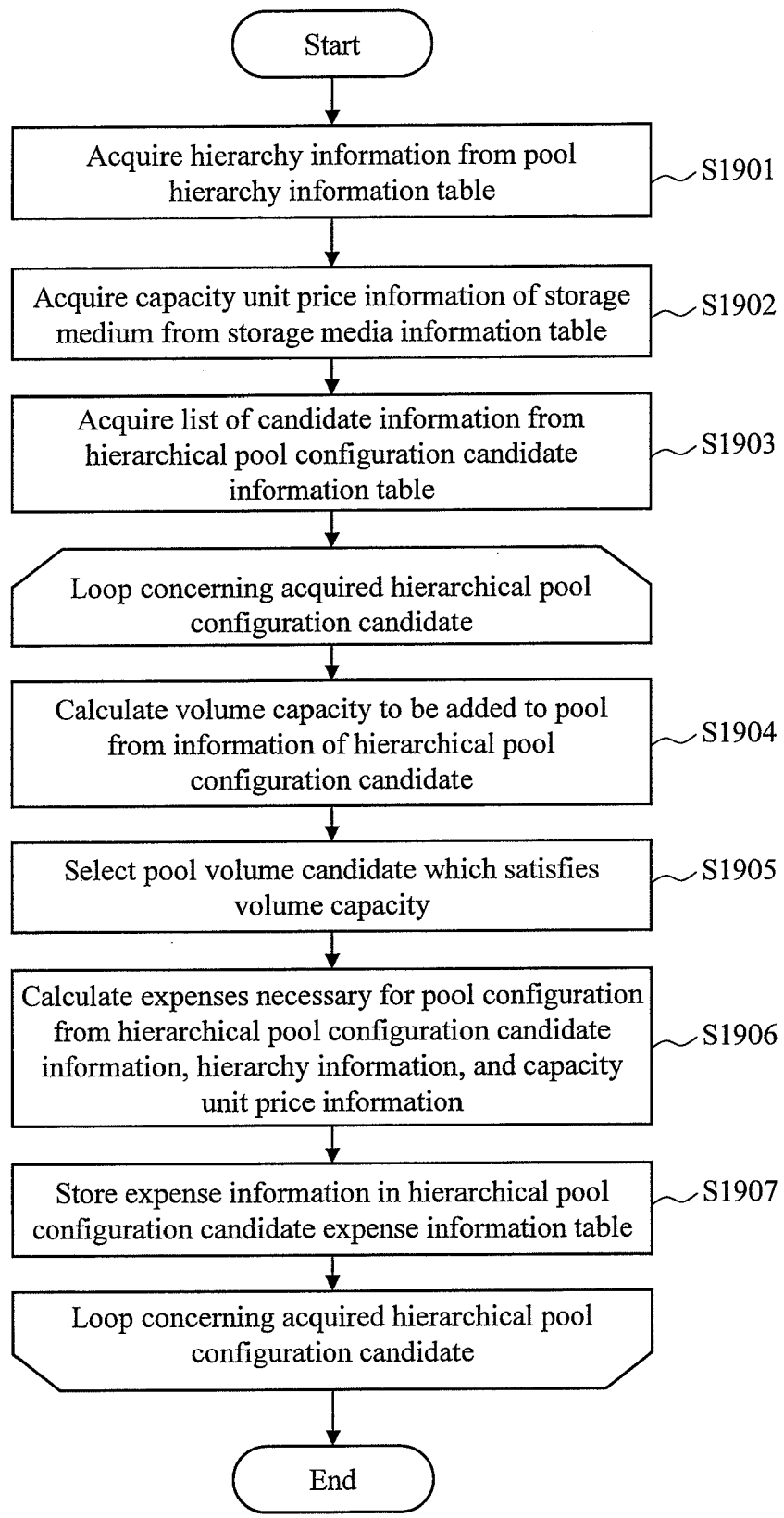
FIG. 19 is a flowchart for explaining details of expense calculation processing 504 (S1304).

FIG. 19 is a flowchart for explaining details of the expense calculation processing 504 (S1304).

In S1901, the storage managing program 110 acquires hierarchy information of a storage medium included in the shift destination storage device 112 from the pool hierarchy information (table) 510 (see FIG. 8).

In S1902, the storage managing program 110 acquires capacity unit price information of storage media included in the hierarchies from the storage media information (table) 511 (see FIG. 9).

In S1903, the storage managing program 110 acquires a list of candidate information from the hierarchical pool configuration candidate information (table) 513 (see FIG. 11) obtained by calculation in S1303. When there are plural candidates, the processing in S1904 to S1907 is repeated by the number of candidates.

In S1904, the storage managing program 110 calculates, with reference to the hierarchical pool configuration candidate information 513, a volume capacity necessary for configuring a hierarchical pool configuration candidate for which expenses are calculated. For example, in the plan 1 shown in FIG. 11, the volume capacity is calculated as 200+100+50=350 GB.

In S1905, the storage managing program 110 selects pool volumes (e.g., PoolVol2_401 to PoolVol4_403 shown in FIG. 4) which satisfy the capacity calculated in S1904.

In S1906, the storage managing program 110 calculates, concerning the candidate for which expenses are calculated, expenses necessary for the pool configuration from the information concerning the capacities of the hierarchies indicated by the hierarchical pool configuration candidate information, the hierarchy information, and the capacity unit price information. The expenses can be calculated by the following expression.

(capacity of the high-order hierarchy×capacity unit price of the storage medium in the high-order hierarchy)+(capacity of the intermediate-order hierarchy×capacity unit price of the storage medium in the intermediate-order hierarchy)+(capacity of the low-order hierarchy×capacity unit price of the storage medium in the low-order hierarchy)

In S1907, the storage managing program 110 stores information concerning the calculated expenses in the hierarchical pool configuration candidate expanse information (table) 515 (see FIG. 12).

<Details of the Hierarchical Pool Configuration Candidate Display Processing (S1305)>

Figure 20:
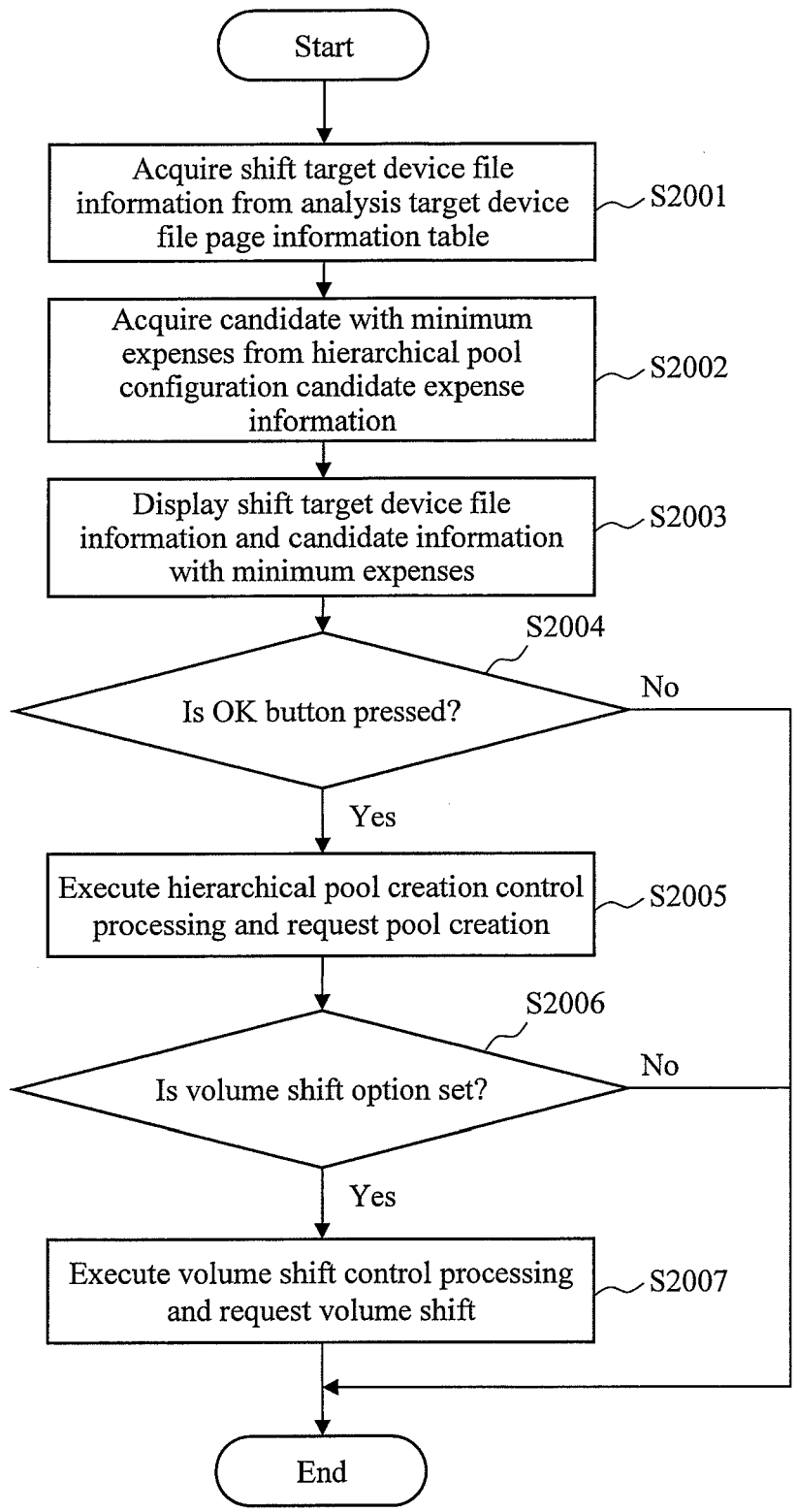
FIG. 20 is a flowchart for explaining details of hierarchical pool configuration candidate display processing 505 (S1305).

FIG. 20 is a flowchart for explaining details of the hierarchical pool configuration candidate display processing 505 (S1305).

In S2001, the storage managing program 110 acquires shift target device file information from the analysis target device file page information (table) 512 (see FIG. 10). For example, when the device file DF1 is selected as a shift target, device file information, a total number of pages included in the device file, and host information are acquired from the analysis target device file page information (FIG. 10). A capacity of a volume to be shifted is calculated by multiplying the total number of pages and a page unit capacity together.

In S2002, the storage managing program 110 acquires a candidate with minimum expenses from the hierarchical pool configuration candidate expense information (table) 515 (see FIG. 12). In FIG. 12, only one candidate is shown. However, when there are plural candidate, in S1303, expenses are calculated concerning the respective candidates. As a GUI, a candidate which presents minimum expenses is displayed. Plural candidates and all expenses corresponding to the candidates may be displayed.

In S2003, the storage managing program 110 generates display data for a GUI on the basis of the shift target device file information acquired in S2001 and information concerning the candidate with minimum expenses acquired in S2002 and displays the generated GUI on the display screen of the storage managing client 101. A configuration example of the displayed GUI is shown in FIG. 21 and explained later.

In S2004, the storage managing program 110 determines whether an OK button in the GUI (see FIG. 21) is clicked by the user (the administrator). If the OK button is not pressed and a cancel button is pressed (No in S2004), the storage managing program 110 ends the hierarchical pool configuration candidate display processing 505. Alternatively, the storage managing program 110 may ends the entire shift processing. When the OK button is pressed (Yes in S2004), the processing shifts to S2005.

In S2005, the storage managing program 110 executes the hierarchical pool creation control processing 506 and instructs the hierarchical pool management control program 114 in the shift destination storage apparatus 112 to allocate the calculated capacities of the hierarchies to a pool and execute pool creation.

Figure 21:
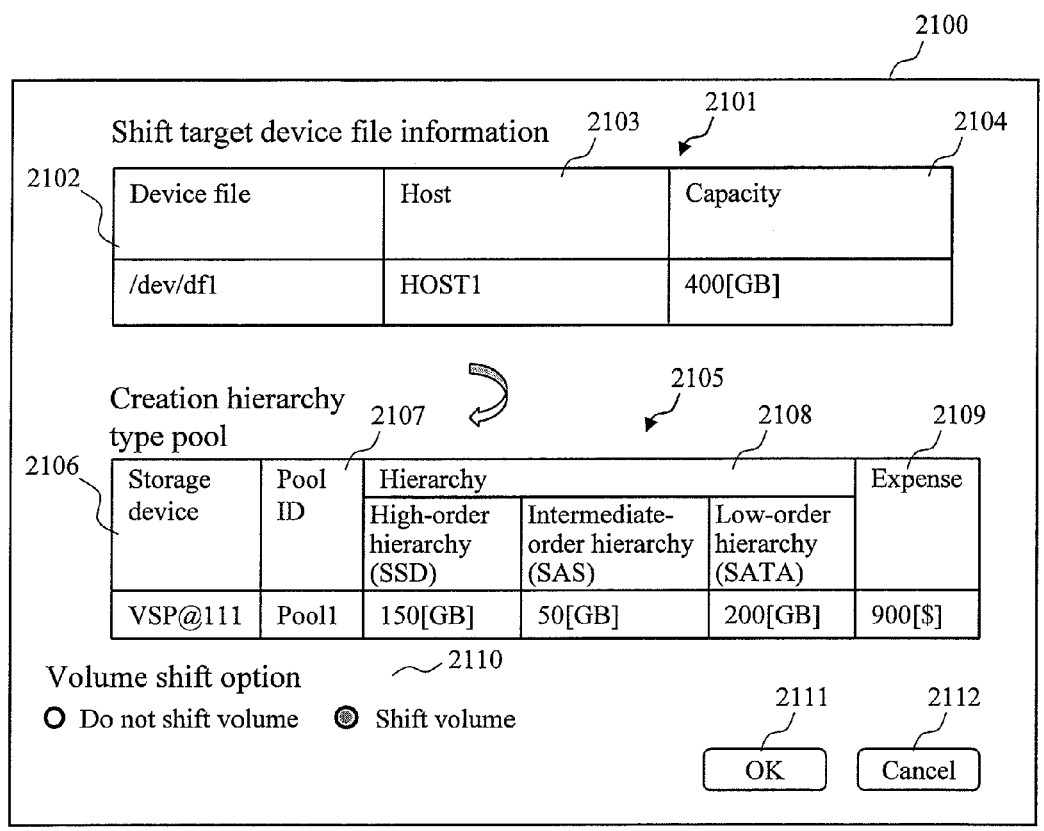
FIG. 21 is a diagram showing a configuration example of a screen (GUI: Graphical User Interface) generated by the hierarchical pool configuration candidate display processing 505.

In S2006, the storage managing program 110 determines whether a volume shift option is set in the GUI (see FIG. 21). In other words, it is determined whether execution of volume shift is selected by the user. When the volume shift option is not set when the OK button is pressed (No in S2006), the storage managing program 110 ends the hierarchical pool configuration candidate display processing 505. Alternatively, the storage managing program 110 may end the entire shift processing. When the shift option is set when the OK button is pressed (Yes in S2006), the processing shifts to S2007.

In S2007, the storage managing program 110 executes the volume shift control processing 507 and instructs the volume shift executing program 115 in the shift destination storage device 112 to shift data of a logical volume of the shift source storage device to a volume associated with the pool created in S2005.

<Example of the Hierarchical Pool Configuration Candidate Display Screen (GUI)>

FIG. 21 is a diagram showing a configuration example of a screen (a GUI) created by the hierarchical pool configuration candidate display processing 505.

The hierarchical pool configuration candidate display screen 2100 includes a shift target device file information display region 2101, a created hierarchical pool display region 2105, a volume shift option designation region 2110, an OK button 2111, and a cancel button 2112.

In the shift target device file information display region 2101, a device file space 2102 indicating a device file name to be shifted, a host space 2103 indicating information for identifying a host server to which the device file belongs, and a capacity space 2104 indicating a total capacity of a page to be shifted are displayed.

In the created hierarchical pool display region 2105, a storage device space 2106 indicating information for specifying a shift destination storage device for which a calculated hierarchical pool configuration candidate is created, a pool ID space 2107 indicating information for identifying a pool created in the shift destination storage device 112, a hierarchy space 2108 indicating storage capacities allocated from the hierarchies which provide virtual logical volumes via the pool, and an expense space 2109 indicating expenses in realizing the candidate are displayed.

The volume shift option 2110 is a button for instructing whether data of a logical volume of the shift source storage device is shifted to a created pool.

The OK button 2111 is a button for instructing presence or absence of pool creation and volume shift.

The cancel button 2112 is a button for instructing release of the pool creation and the volume shift.

(2) Second Embodiment

According to the first embodiment, when a logical volume is shifted from the shift source storage device to the storage device 112 having the hierarchical pool function at the shift destination, even if a pool created before is present, a pool is created anew and the logical volume is shifted.

However, when this is repeatedly executed, pools equivalent to the number of logical volumes which should be shifted have to be created. Therefore, the number of pools created in the shift destination storage device 112 is too large. It is likely that management is complicated.

Therefore, a second embodiment provides a mechanism for enabling, when a created pool is already present, addition of a virtual logical volume via the pool.

Since a system according to the second embodiment can adopt a configuration same as that in the first embodiment (FIG. 1), explanation of the system is omitted. Concerning various kinds of information and processing contents, differences are mainly explained below.

<Concept of Shift of a Logical Volume to an Added Virtual Logical Volume>

Figure 22:
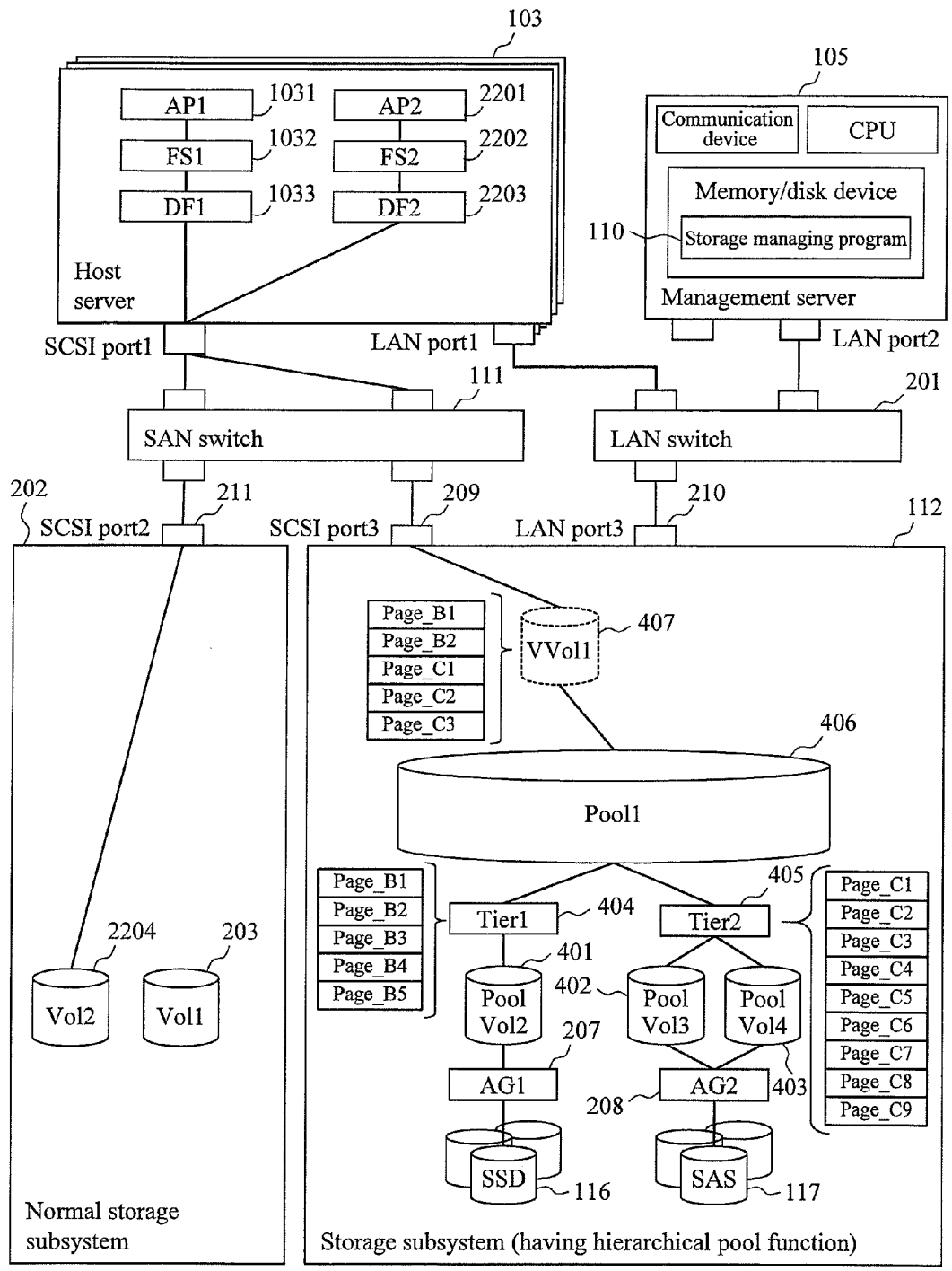
FIG. 22 is a diagram showing a specific example of the configuration of resources and a relation among the resources in an SAN environment before processing for shifting another logical volume is executed in a state in which an existing pool is present in a shift destination storage device and a logical volume is already shifted from a shift source storage device according to a second embodiment of the present invention.
Figure 23:
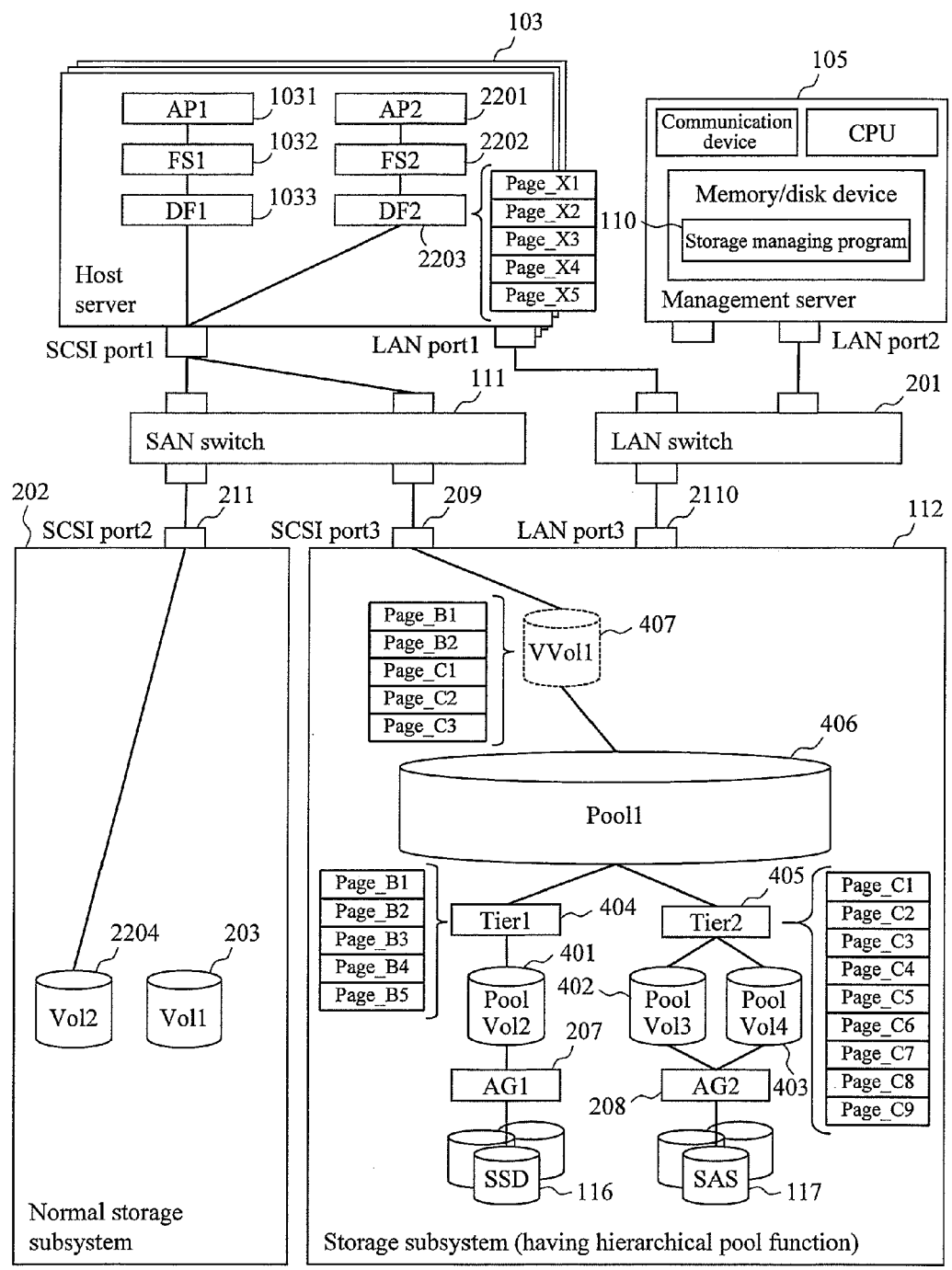
FIG. 23 is a diagram showing a specific example of the configuration of the resources and a relation among the resources in the SAN environment during application of the second embodiment of the present invention (during virtual logical volume addition processing).
Figure 24:
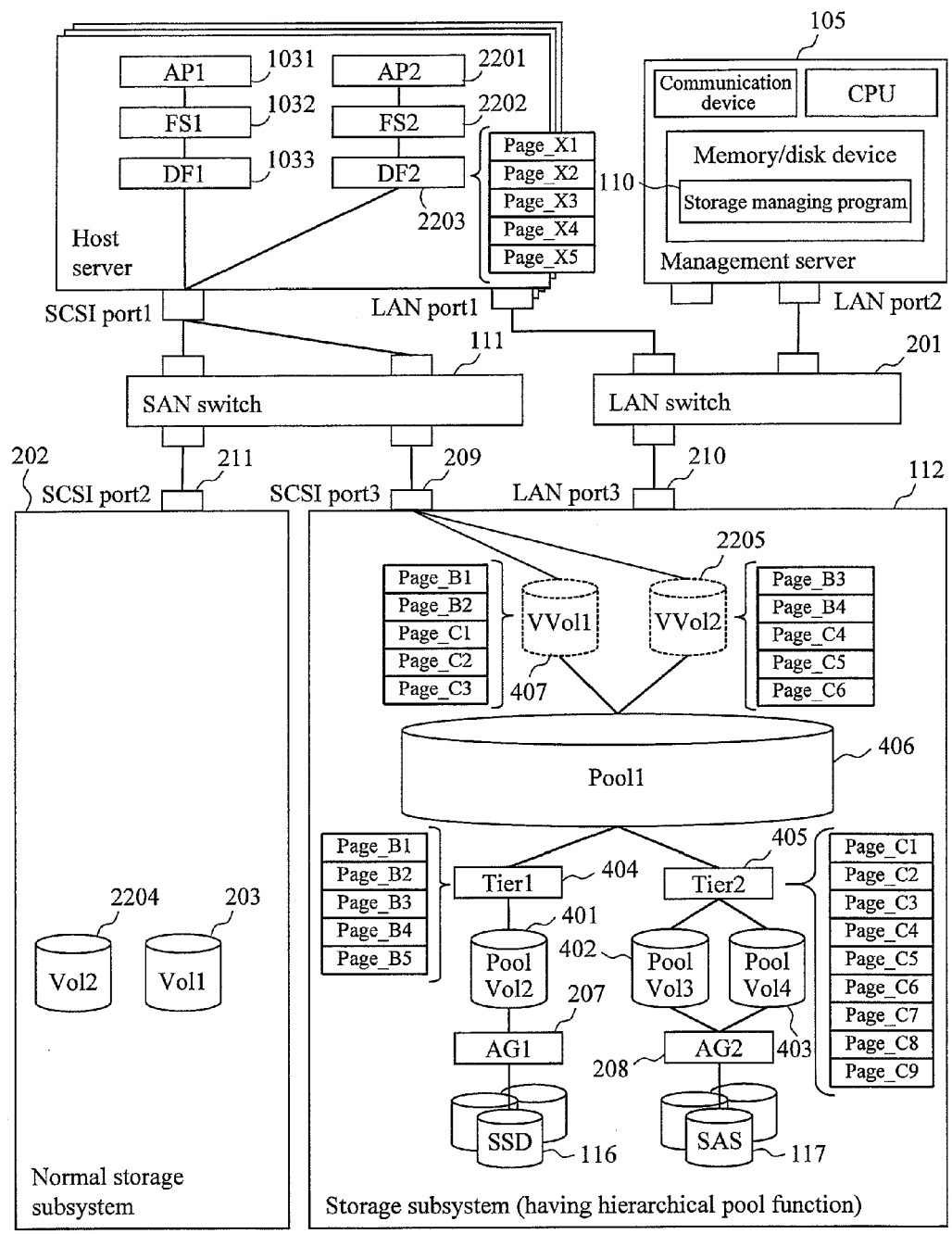
FIG. 24 is a diagram for explaining a specific example of the configuration of the resources and a relation among the resources in the SAN environment after the application of the present invention (after a virtual logical volume is added and a logical volume is shifted).

FIGS. 22 to 24 are diagrams showing relation among resources before shift, during shift, and after shift in adding a virtual logical volume on an existing pool of the storage device 112 having the hierarchical pool function and shifting a volume of an ordinary storage device not having the hierarchical pool function to the virtual logical volume. FIG. 22 shows the relation before the shift, FIG. 23 shows the relation during the shift, and FIG. 24 shows the relation after the shift. The resource is a general term of hardware (a storage device, a host server, etc.) included in an SAN and physical or logical components (an array group, a logical volume, etc.) of the hardware and programs (the job software 106, a database managing system, a file managing system, volume managing software, etc.) executed on the hardware and logical components (a file system, a logical device, etc.) of the programs.

(i) Resource Relation Before the Shift

FIG. 22 is a diagram showing a specific example of the configuration of the resources and a relation among the resources in an SAN environment before another logical volume (Vol2_2204) is shifted in a state in which an existing pool (Pool1_406) is present in the shift destination storage device 112 and a logical volume (Vol1_203) is already shifted from the shift source storage device 202.

In the host server 103, applications AP1_1031 and AP2_2201 are running AP1_1031 and AP2_2201 are any ones of plural applications included in the job software 106 shown in FIG. 1. File systems FS1_1032 and FS2_2202 and device files DF1_1033 and DF2_2203 are present in the host server 103. FS1_1032 and FS2_2202 and DF1_1033 and DF2_2203 are examples of resources from which the host monitoring agent 108 acquires information. Functions of a file system and a device file are explained in the first embodiment. Therefore, explanation of the functions is omitted.

The logical volume Vol1_203 associated with the device file DF1_1033 is shifted to the virtual logical volume VVol1_407 of the shift destination storage device 112. Therefore, at the present point, the device file DF1 manages an I/O request to the virtual logical volume VVol1_407. On the other hand, the device file DF2_2203 manages an I/O request to the logical volume Vol2_2204 still present in the shift source storage device 202.

PageB1 and B2 are allocated to the virtual logical volume VVol1_407 from the storage hierarchy Tier1_404 including PoolVol2_401 (a logical volume) via Pool1_406. PageC1 to C3 are allocated from the storage hierarchy Tier2_405 including PoolVol3_402 and Pool1Vol4_403.

The logical volumes (PoolVol2 to 4) are generated with storage regions allocated from the array group AG1_207 and/or AG2_208. The array groups AG1_207 and AG2_208 are high-speed and highly-reliable logical disk drives generated from plural storage media according to functions of the CPU 119 of the shift destination storage device 112. The storage media include the SSDs 116 as semiconductor storage media and the SASs 117 and the SATAs 118 as hard disk devices. In this example, types of the storage medium are SSD, SAS, and SATA. However, the storage medium may be any one of the storage media and may be a combination of the storage media.

(ii) Resource Relation During the Shift

FIG. 23 is a diagram showing a specific example of the configuration of the resources and a relation among the resources in the SAN environment during application of the second embodiment of the present invention (during virtual logical volume addition processing).

In FIG. 23, Page_X1 to Page_X5 are obtained by dividing a storage region of the device file DF2_2203 by a page size present in a virtual logical volume of a hierarchical pool. Before logical volume shift, the device file DF2_2203 is associated with the logical volume Vol2_2204 and manages an I/O request of an application to and from the logical volume Vol2_2204. Therefore, before the logical volume shift, the device file DF2_2203 manages, in an address unit, access information (access characteristics: TOPS, a data transfer amount, last access time, etc.) to the logical volume Vol2_2204. When creation of a shift candidate of data of the logical volume Vol2_2204 (addition of a virtual logical volume) is instructed, in order to realize access to the volume with the virtual logical volume of the hierarchical pool, as explained above, the host monitoring agent 108 divides the storage region of the device file DF2_2203 in a page size and generates access information in a page unit. More specifically, the host monitoring agent 108 totalizes, for each of pages generated by dividing the storage region of the device file DF2_2203, access information managed in an address unit to thereby acquire access information in the pages.

(iii) Resource Relation after the Shift

FIG. 24 is a diagram showing a specific example of the configuration of the resources and a relation among the resources in the SAN environment after the present invention is applied (after a virtual logical volume is added and a logical volume is shifted).

In a storage region allocated via Pool1_406, there is still room even after generation of the virtual logical volume 1_1407. Therefore, a storage region is also allocated to an added virtual logical volume VVol2_2205 via Pool1_406, whereby it is possible to efficiently use the storage regions of the hierarchies of the storage device.

As explained above, Pool1_406 includes the storage hierarchies Tier1_404 to Tier2_405. A pool exemplified by Pool1_406 provides the host server 103 with a virtual logical volume exemplified by VVol2_2205. Therefore, after shift of a logical volume, the device file DF2_223 manages an I/O request to the virtual logical volume VVol2_2205.

Pool1_406 includes plural types of storage media. The storage media provide a pool (e.g., Pool1_406) with pool volumes (e.g., PoolVol2_401 to PoolVol4_403), which are actual regions including divided regions of an array group (e.g., AG1_207 or AG2_208).

The virtual logical volume VVol2_2205 is recognized as a logical disk drive by the host server 103 according to a virtual logical volume management control function of the storage device 112. However, unlike an actual logical volume, when the virtual logical volume VVol2_2205 is created, a capacity is only defined and a storage region equivalent to the defined capacity is not secured. Thereafter, when a write request to a new address of VVol2_2205 is generated, storage regions are allocated by a necessary amount. The storage regions allocated to the virtual logical volume are allocated in a unit called page. In the example shown in FIG. 24, Page_B3 to Page_B4 are allocated to VVol2_2205 from Tier1_404. Page_C4 to Page_C6 are allocated to VVol2_2205 from Tier2_405.

The storage hierarchies Tier1_404 to Tier2_405 are hierarchies of a logical storage medium created for each of types of storage media such as SSD and SAS. The storage hierarchies Tier1_404 to Tier2_405 include the plural pool volumes PoolVol2_401 to PoolVol4_403 sliced from the array groups AG1_207 to AG2_208 created for each of types of the storage media. As a specific example, Tier1_404 shown in FIG. 24 is an SSD, a storage hierarchy type of which is a semiconductor storage medium. Tier2_405 is an SAS, which is a hard disk device. Therefore, Tier1_404 has higher performance than Tier2_405. Storage hierarchies allocate data of a virtual logical volume from a pool volume in a unit called page.

Page_B1 to Page_B5 and Page_C1 to Page_C9 are units of storage regions for the storage hierarchies to allocate data to the virtual logical volume. In a virtual logical volume belonging to a pool having storage hierarchies like Pool1_406, allocation of storage regions are controlled such that, in a single pool, pages are arranged in a high-performance storage hierarchy in order from a page having access information (also referred to as access characteristics. The access characteristics include an access frequency (as a representative one, the number of I/Os per unit time), a data transfer amount, and last access time) relatively high compared with other pages. Conversely, a page having relatively low access information is arranged in a low-performance storage hierarchy.

In the arrangement of the pages, the storage managing program 110 acquires configuration information (storage hierarchy information and page information) of the storage device 112 and access information in a page unit from the storage device 112 via the storage monitoring agent 109 and performs arrangement of the pages according to the rules explained above.

In the example shown in FIG. 24, for example, when an access frequency to a page Page_C4 currently used for the virtual logical volume VVol2_2205 substantially increases, rearrangement of the pages for allocating Page_B5 of Tier1_404 to VVol1_2205 is performed.

<Functions of the Storage Managing Program>

FIG. 25 is a block diagram for explaining functions of the storage managing program 110 according to the second embodiment. Functions same as those in the first embodiment are denoted by the same reference numerals. Details of processing by the functions are explained with reference to flowcharts and GUI screen examples (FIGS. 31 to 36) explained later.

The storage managing program 110 executes the agent information collection processing 501, shift target device file and shift destination hierarchical pool selection processing 2501, analysis target page specifying processing 2502, hierarchical pool configuration addition candidate calculation processing 2503, the expense calculation processing 504, hierarchical pool configuration addition candidate display processing 2504, hierarchical pool addition control processing 2505, and the volume shift control processing 507. The respective kinds of processing can also be realized as program modules included in the storage managing program 110.

The storage managing program 110 starts and executes the agent information collection processing 501 at predetermined timing (e.g., according to scheduling configuration, periodically, or according to an instruction by a user using the storage managing client 101 or an instruction from other processing), receives configuration/capacity information, performance information, and access information of devices, agents (programs), and components in the SAN environment collected by the application monitoring agent 107, the host monitoring agent 108, and the storage monitoring agent 109, and stores the information as the device file page information 508, the volume information 509, the pool hierarchy information 510, the storage media information 511, pool volume page information 2506, hierarchical pool configuration information 2507, and pool volume information 2508. A resource is a general term of hardware (the storage device 112, the host server 103, etc.) included in the SAN environment and physical or logical components (a parity group, a logical volume, etc.) of the hardware and programs (job software, a database managing system, a file managing system, volume managing software, etc.) executed on the hardware and logical components (a file system, a logical device, etc.) of the programs.

The storage managing program 110 searches through the device file page information 508 and the volume information 509 using a device file to be shifted and a hierarchical pool at a shift destination, which are designated by the storage managing client 101, as keys to thereby execute the shift target device file and shift destination hierarchical pool selection processing 2501, specifies page information and shift destination hierarchical pool information of the device file to be shifted, and stores the page information and the pool information respectively as the analysis target device file page information 512 and shift destination hierarchical pool information 2509.

The storage managing program 110 executes the analysis target page specifying processing 2502 to thereby generate and store analysis target page information 1510. More specifically, in the analysis target page specifying processing 2502, the storage managing program 110 acquires information concerning a shift destination hierarchical pool from the shift destination hierarchical pool information 2508 and specifies pool volumes included in the pool from the pool volume information 2508. The storage managing program 110 compares the specified pool volumes and the pool volume page information 2506 and specifies a page on a pool volume to be analyzed. Further, concerning the page on the pool volume and a page on a device file acquired from the analysis target device file page information 512, the storage managing program 110 stores page identifiers and access information to the pages in the analysis target page information.

The storage managing program 110 executes the hierarchical pool configuration addition candidate calculation processing 2503 and generates and stores the hierarchical pool configuration candidate information 513. More specifically, in the hierarchical pool configuration addition candidate calculation processing 2503, when the shift target device file is shifted to a virtual logical volume, the storage managing program 110 calculates, on the basis of the analysis target page information 2510, the pool hierarchy information 510, and the storage media information 511, a hierarchical pool configuration which satisfies response performance of the shift target device file and stores the hierarchical pool configuration as the hierarchical pool configuration candidate information 513.

Figure 36:
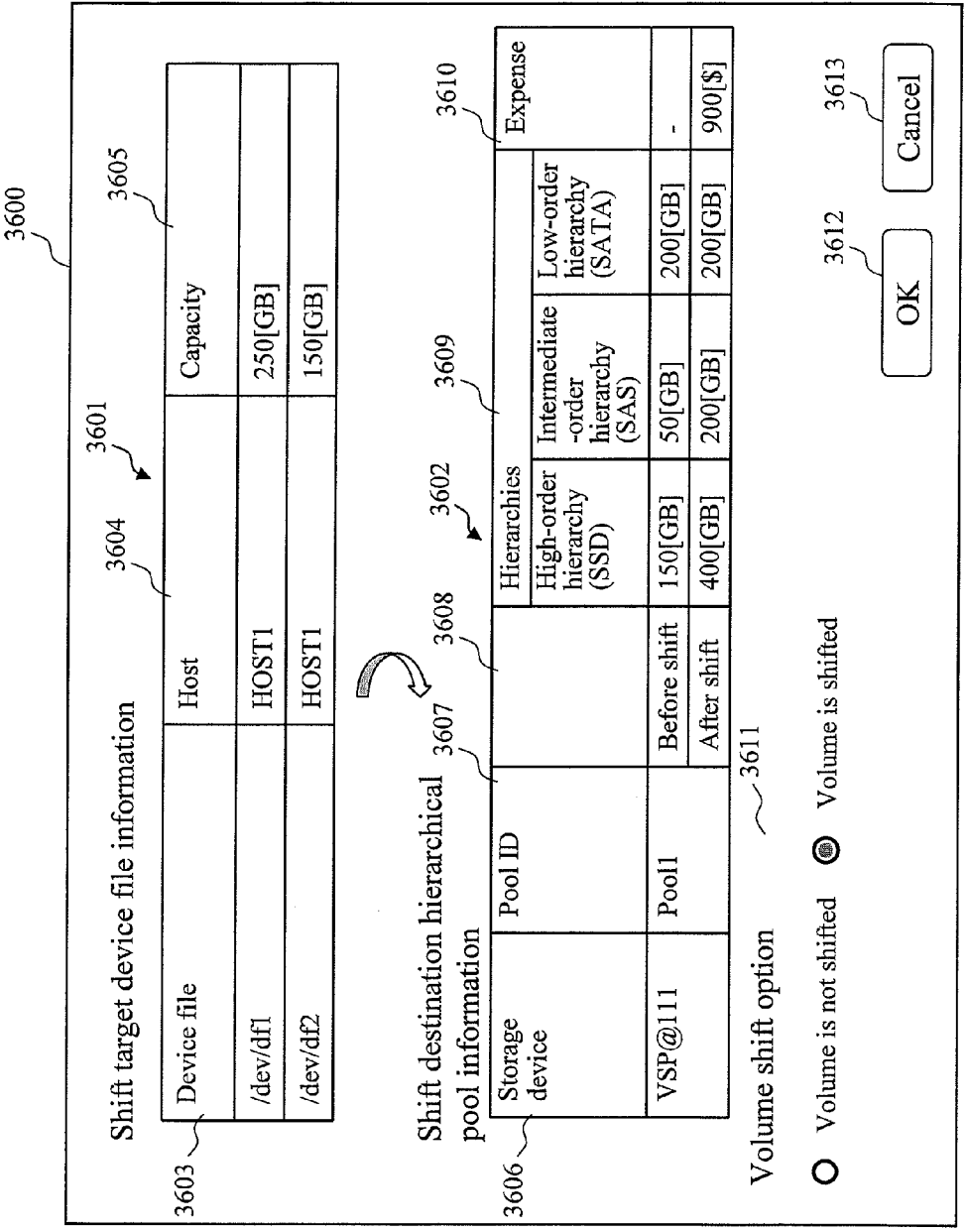
FIG. 36 is a diagram showing a configuration example of a screen (GUI) generated by hierarchical pool configuration candidate display processing 2404.

Further, the storage managing program 110 executes the hierarchical pool configuration addition candidate display processing 2504 using the analysis target device file page information 512, the hierarchical pool configuration candidate information 513, the expense information by hierarchical pool configuration candidate 515, and the shift destination hierarchical pool information 2509, generates data for addition candidate display, and displays the data for addition candidate display on the display screen of the storage managing client 101 as a GUI (see FIG. 36).

When the user instructs execution of creation of a generated hierarchical pool addition candidate using the GUI, the storage managing program 110 executes the hierarchical pool addition control processing 2505 and instructs the hierarchical pool management control program 114 of the shift destination storage device 112 to create a virtual logical volume indicated by the designated hierarchical pool addition candidate.

Since the expense calculation processing 504 and the volume shift control processing 507 are the same as those in the first embodiment, explanation of the expense calculation processing 504 and the volume shift control processing 507 is omitted. Details of the processing and the like are explained later with reference to FIGS. 31 to 36.

<Configuration Examples of Various Kinds of Information>

FIGS. 26 to 30 are diagrams showing configuration examples of various kinds of information stored in the management server 105 and used by the storage managing program 110 in the second embodiment. In order to explain the information, a table format is adopted. However, a form of the information is not limited. Any form may be adopted as long as the form is a structure in which a relation of configuration items can be grasped. In the second embodiment, information indicated by the device file page information 508 (FIG. 6) to the hierarchical pool configuration candidate expense information 515 (FIG. 12) is also used. However, explanation of the information is omitted.

(i) Pool Volume Page Information (Table)

Figure 26:
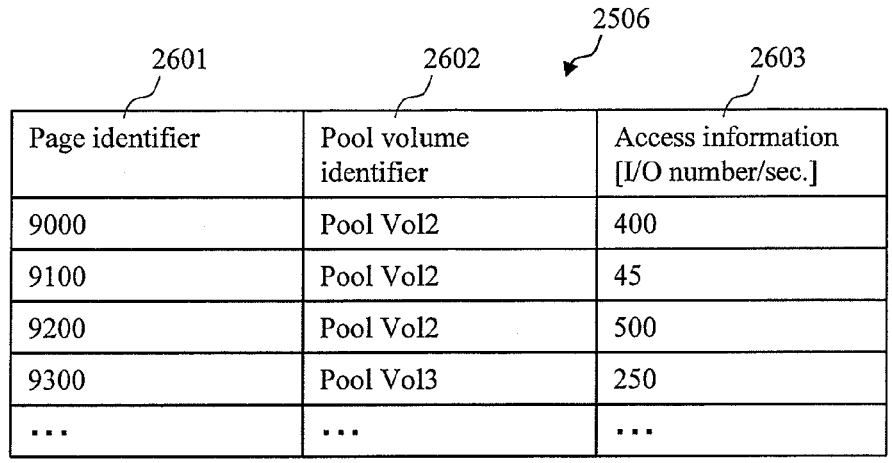
FIG. 26 is a diagram showing a configuration example of pool volume page information (table) 2506.

FIG. 26 is a diagram showing a configuration example of the pool volume page information (table) 2506. The pool volume page information (table) 2506 is a table for managing access information to pages to which storage regions are allocated from the hierarchies via a pool already present in the shift destination storage device 112. The pool volume page information (table) 2506 includes a page identifier 2601, a pool volume identifier 2602, and access information 2603 as configuration items.

The page identifier 2601 is information for uniquely specifying and identifying pages to which storage regions are allocated via the pool already present in the shift destination storage device 112.

The volume identifier 2602 is information for uniquely specifying and identifying pool volumes (e.g., equivalent to PoolVol2_402 to PoolVol4_403) of the shift destination storage device 112 to which pages corresponding thereto belongs. In the example shown in FIG. 26, it is seen that pages 9000 to 9200 are pages to which storage regions are allocated from PoolVol2 and a page 9300 is a page to which a storage region is allocated from PoolVol3.

The access information 2603 indicates access information (access characteristics: IOPS, a data transfer amount, last access time, etc.) to the pages.

(ii) Hierarchical Pool Configuration Information (Table)

Figure 27:
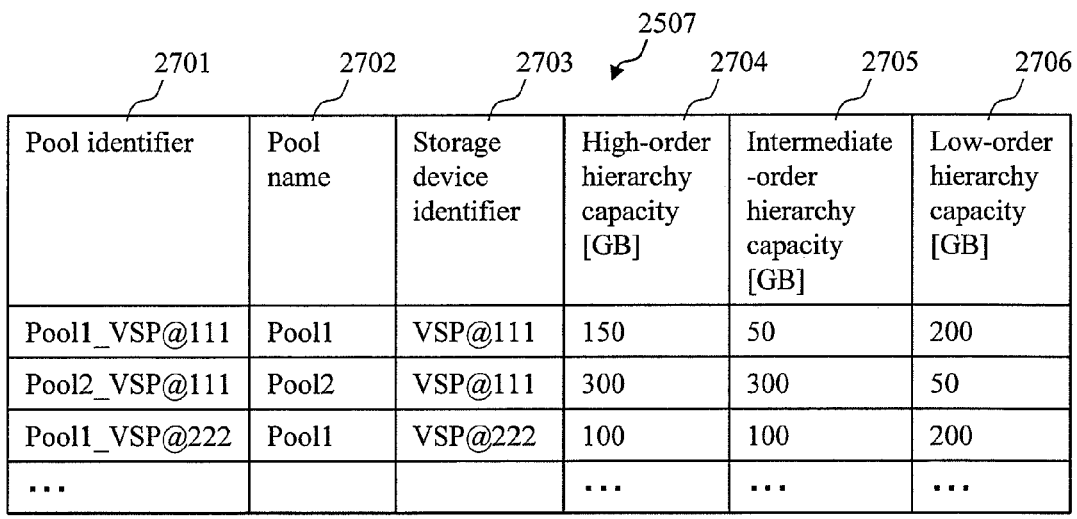
FIG. 27 is a diagram showing a configuration example of hierarchical pool configuration information (table) 2507.

FIG. 27 is a diagram showing a configuration example of the hierarchical pool configuration information (table) 2507. The hierarchical pool configuration information (table) 2507 is a table for managing a hierarchical pool and the configuration of a storage device including the hierarchical pool. The hierarchical pool configuration information (table) 2507 includes a pool identifier 2701, a pool name 2702, a storage device identifier 2703, a high-order hierarchy capacity 2704, an intermediate-order hierarchy capacity 2705, and a low-order hierarchy capacity 2706 as configuration items.

The pool identifier 2701 is information for uniquely specifying and identifying a pool which is created in the shift destination storage device 112 (including a case in which plural shift destination storage devices are present) and is already present.

The pool name 2702 is information indicating a pool name corresponding thereto.

The storage device identifier 2703 is information for uniquely specifying and identifying the shift destination storage device 112 including the corresponding pool.

The high-order hierarchy capacity 2704 to the low-order hierarchy capacity 2706 are information indicating capacities of the hierarchies allocated to the corresponding pool.

(iii) Pool Volume Information (Table)

Figures 28, 29:
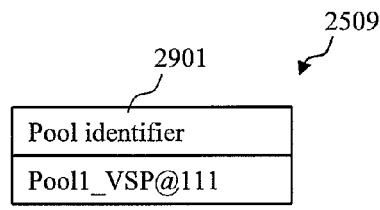
FIG. 28 is a diagram of a configuration example of pool volume information (table) 2508.
FIG. 29 is a diagram showing a configuration example of shift destination hierarchical pool information (table) 2509.

FIG. 28 is a diagram showing a configuration example of the pool volume information (table) 2508. The pool volume information (table) 2508, which is a table for managing a pool volume, includes a pool volume identifier 2801, a storage device identifier 2802, and a pool identifier 2803 as configuration items.

The pool volume identifier 2801 is information for uniquely specifying and identifying a pool volume present in the shift destination storage device 112 (including a case in which plural shift destination storage devices are present). As explained above, a hierarchy (Tier) includes at least one pool volume. A pool is generated from hierarchies.

The storage device identifier 2802 is information for uniquely specifying and identifying a shift destination storage device including a pool volume corresponding thereto.

The pool identifier 2803 is information for uniquely specifying and identifying a pool to which the corresponding pool volume belongs.

(iv) Shift Destination Hierarchical Pool Information (Table)

FIG. 29 is a diagram showing a configuration example of the shift destination hierarchical pool information (table) 2509. The shift destination hierarchical pool information (table) 2509 is a table for managing a pool designated by the user (the administrator) for which a virtual logical volume is added. The shift destination hierarchical pool information (table) 2509 includes a pool identifier 2901 as a configuration item.

In the space of the pool identifier 2901, when the user (the administrator) creates a virtual logical volume using the storage managing client 101 and selects a pool associated with the virtual logical volume, identification information of the selected pool is stored.

(v) Analysis Target Page Information (Table)

FIG. 30 is a diagram showing a configuration example of the analysis target page information (table) 2510. The analysis target page information (table) 2510 is a table for managing access information to a page already allocated to an existing pool for which a virtual logical volume is about to be added and a page allocated to the virtual logical volume about to be added. The analysis target page information (table) 2510 includes a page identifier 3001 and access information 3002 as configuration items.

It is possible to determine, according to information concerning a total number of pages listed in the analysis target page information (table) 2510 and a capacity per one page, whether the existing pool has a capacity enough for allocating storage regions to all the pages. When a new virtual logical volume is added in the existing pool in addition to a virtual logical pool set earlier, it is possible to add the virtual logical volume and shift a target page only when a sum of a storage capacity consumed by the virtual logical volume set earlier and a total capacity of pages shifted to the virtual logical volume to be added is equal to or smaller than a storage capacity allocated to the pool. When the sum of the capacities exceeds the pool capacity, addition of the virtual logical volume to the existing pool is not executed.

In FIG. 30, the page identifier 3001 is information for uniquely specifying and identifying a page allocated to or a page to be allocated to a virtual logical volume. In FIG. 30, the pages 9000 to 9100 are pages provided from the existing virtual logical volume to the host server 103. Pages 100 to 130 are pages to be analyzed shifted to a virtual logical volume in which the pages 100 to 130 are added.

The access information 3002 is information indicating access information (e.g., IOPS) to a page corresponding thereto. According to the example explained above, to a page having higher access information, storage regions are more often allocated from the high-order hierarchy. In this case, storage regions may be allocated independently to pages in virtual logical volumes according to a level of access information. Alternatively, both pages to which storage regions are already allocated and pages shifted to virtual logical volumes may be rearranged in order from one having highest access information and the storage regions may be allocated from the high-order hierarchy again for each of the virtual logical volumes. Therefore, concerning pages included in an existing virtual logical volume, in some case, a hierarchy allocated before addition of a virtual logical volume and a hierarchy allocated after the addition are different.

<Overview of the Virtual Logical Volume Addition Processing>

Figure 31:
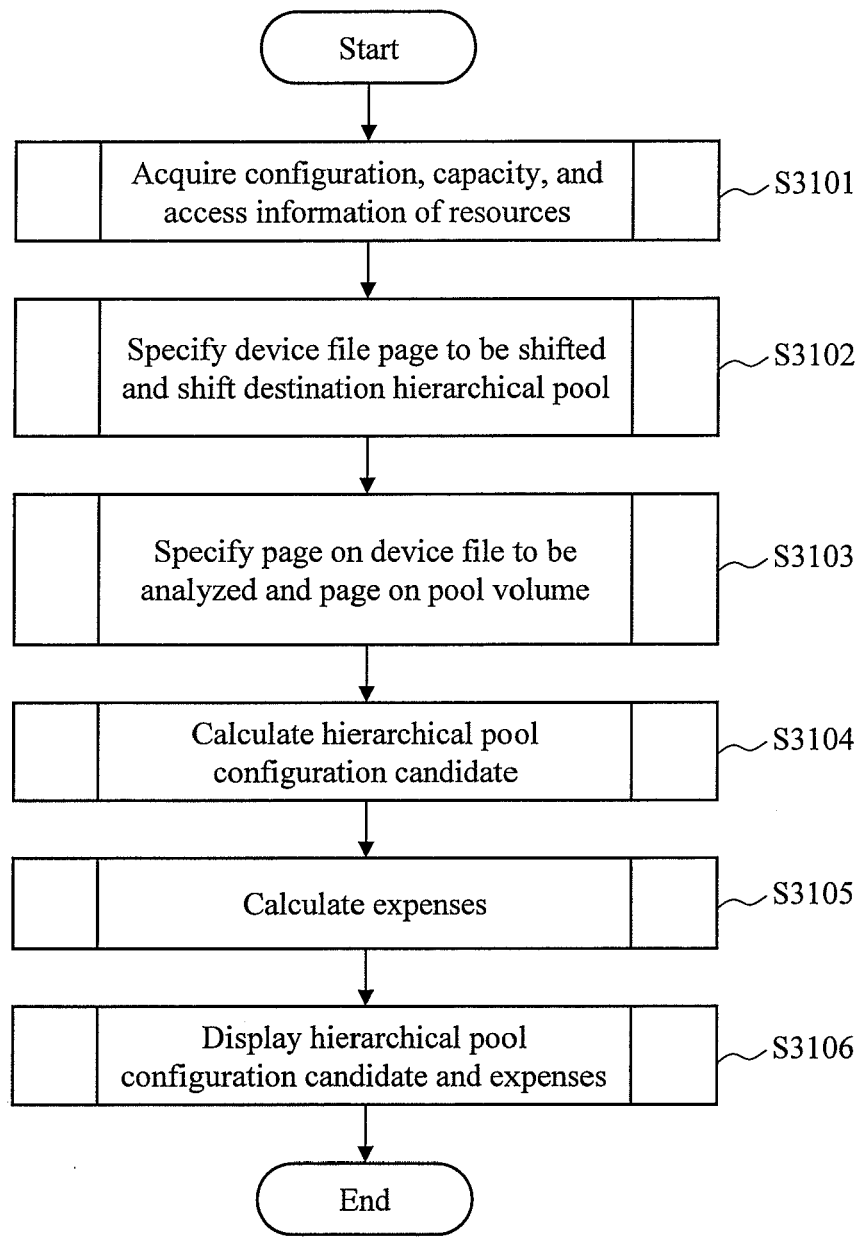
FIG. 31 is a flowchart for explaining an overview of processing for adding a virtual logical volume to an existing pool of a storage device having a hierarchical pool function (a shift destination storage device) and shifting data of a logical volume of a shift source storage device to the added virtual logical volume.

FIG. 31 is a flowchart for explaining an overview of processing for adding a virtual logical volume in an existing pool of the storage device (the shift destination storage device) 112 having the hierarchical pool function and shifting data of a logical volume of a shift source storage device to the added virtual logical volume.

In S3101, the storage managing program 110 executes the agent information collection processing 501 and acquires configuration information of the shift destination storage device 112, capacities and configuration information of pool volumes in the shift destination storage device 112, information concerning the existing pool, information concerning pages stored in the existing virtual logical volume, and configuration information and access information of pages of device files present in the host server 103. In other words, the information stored in FIGS. 26 to 28 is acquired by the processing. Details of S3101 are as explained with reference to FIG. 14.

In S3102, the storage managing program 110 executes the shift target device file and shift destination hierarchical pool selection processing 2501 and specifies a page on a device file to be analyzed and a hierarchical pool in a virtual logical volume is added and to which the page is shifted. In other words, the information stored in FIGS. 10 and 29 is acquired by the processing. Details of S3102 are explained later with reference to FIG. 32.

In S3103, the storage managing program 110 executes the analysis target page specifying processing 2502 with reference to the pool volume page information 2506, the hierarchical pool configuration information 2507, the pool volume information 2508, and the analysis target device file page information 512 and specifies the page on the device file to be analyzed and the page on the pool volume included in the hierarchical pool, each page having been selected in S3102. In other words, the information stored in FIG. 30 is acquired by the processing. Details of S3103 are explained later with reference to FIG. 34.

In S3104, the storage managing program 110 executes the hierarchical pool configuration addition candidate calculation processing 2503 with reference to the device file page information 508, the volume information 509, the pool hierarchy information 510, the storage media information 511, and the analysis target page information 2510, calculates at least one candidate of a hierarchical pool configuration, and stores the candidate as the hierarchical pool configuration candidate information 513. Details of S3104 are as explained with reference to FIG. 17.

In S3105, the storage managing program 110 executes the expense calculation processing 504, calculates expenses (storage management cost) in realizing hierarchical pool configurations calculated in S3105, and stores the expenses as the expense information by hierarchical pool configuration candidate 515. Details of S3105 are as explained with reference to FIG. 19.

In S3106, the storage managing program 110 executes the hierarchical pool configuration addition candidate display processing 2504, generates a CPU concerning information concerning hierarchical pool configuration candidates obtained in S3105 and expenses for realizing the hierarchical pool configuration candidates, and displays the GUI on, for example, the display screen of the storage managing client 101. Details of S3106 are explained later with reference to FIG. 35.

According to the processing explained above, the configuration of a virtual logical volume, a storage capacity allocated from storage device in the hierarchies, and expenses in shifting a logical volume present in the normal storage device not having the hierarchical pool function to a virtual logical volume added in an existing pool of a storage device having the hierarchical pool function are presented to the user (the administrator). The user can actually instruct shift of the logical volume on the basis of the displayed information or can select operation for not shifting the logical volume if shift cost exceeding an estimated budget seems to be required.

<Details of the Shift Target Device File and Shift Destination Hierarchical Pool Selection Processing (S3102)>

Figure 32:
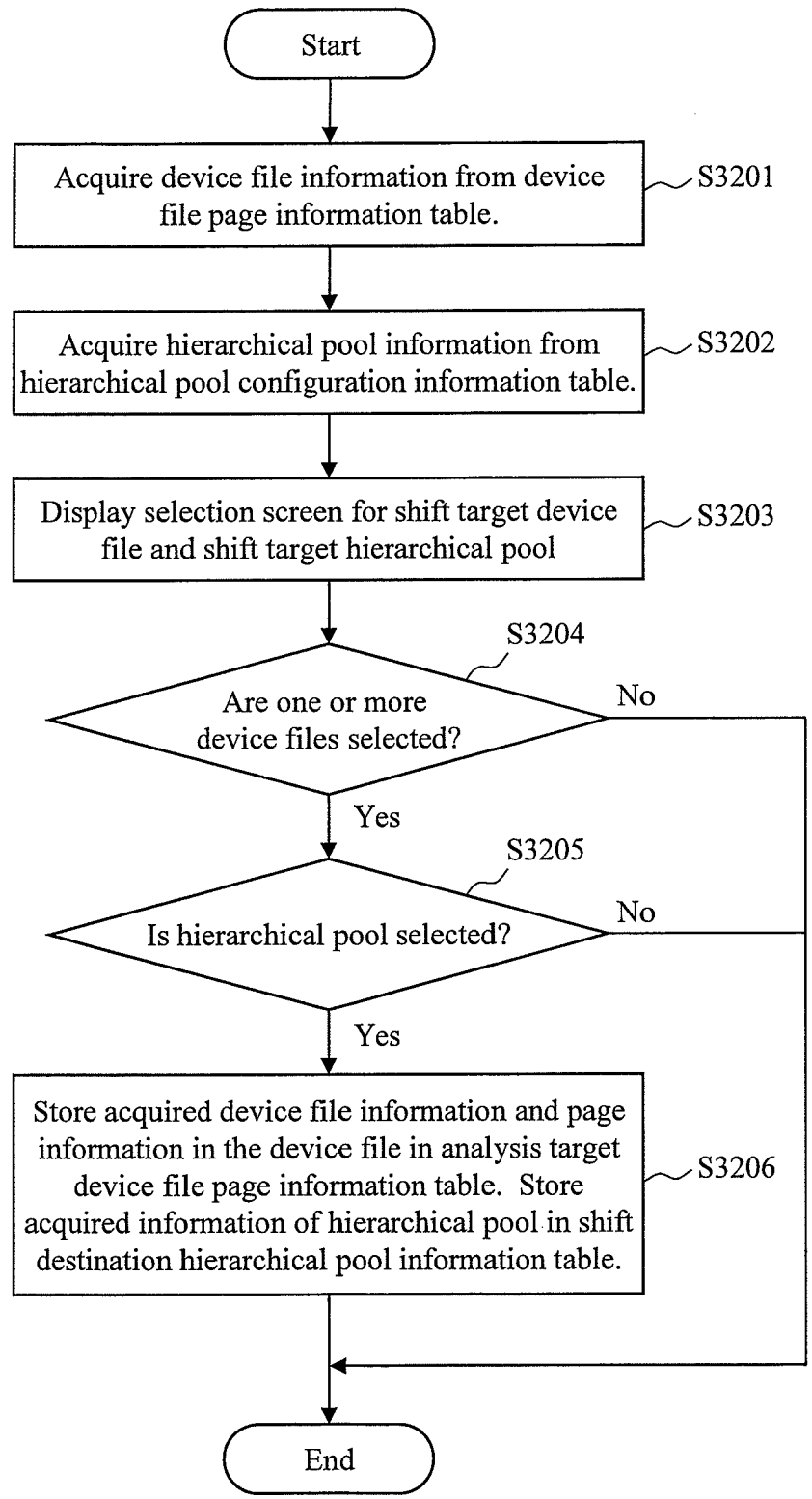
FIG. 32 is a flowchart for explaining details of shift target device file and shift destination hierarchical pool selection processing 2501 (S3102).

FIG. 32 is a flowchart for explaining details of the shift target device file and shift destination hierarchical pool selection processing 2501 (S3102).

In S3201, the storage managing program 110 acquires device file information from the device file page information (table) 508 (see FIG. 6). Specifically, information (a device file name, a host name to which a device file belongs, and a capacity of a logical volume) of a device file which operates in the host server 103 and manages an I/O request to a logical volume of a shift source storage device is acquired.

In S3202, the storage managing program 110 acquires information concerning a hierarchical pool already present in the shift destination storage device 112 from the hierarchical pool configuration information (table) 2507 (see FIG. 27). Specifically, information concerning an identifier of a storage device in which an existing pool is present, a pool name or a pool identifier, and allocation capacities of hierarchies included in the pool is acquired.

In S3203, the storage managing program 110 generates, on the basis of the information acquired in S3201 and S3202, a selection screen (a GUI) for a shift target device file and a shift target hierarchical pool and displays the selection screen on the display screen of the storage managing client 101. A configuration example of the screen (the GUI) is explained later with reference to FIG. 33.

In S3204, the storage managing program 110 determines whether the user has selected at least one device file from a device file group displayed on the selection screen generated in S3203. For example, if no device file is selected within a predetermined time (No in S3204), the shift target device file and shift destination hierarchical pool selection processing 2501 ends. Since the following processing cannot be executed unless a shift target is specified, the storage managing program 110 may end the virtual logical volume addition processing itself. Alternatively, the storage managing program 110 may put the processing on standby until one or more device files are selected. When at least one device file is selected (Yes in S3204), the processing shifts to S3205.

In S3205, the storage managing program 110 determines whether the user has selected at least a pool in which a virtual logical volume is added from a hierarchical pool group displayed on the selection screen generated in S3203. If no pool is selected (No in S3205), the shift target device file and shift destination hierarchical pool selection processing 2501 ends. Since the following processing cannot be executed unless a pool in which a virtual logical volume is added is specified, the storage managing program 110 may end the virtual logical volume addition processing itself. Alternatively, the storage managing program 110 may put the processing on standby until a hierarchical pool is selected. When a hierarchical pool is selected (Yes in S3205), the processing shifts to S3206.

In S3206, the storage managing program 110 acquires information concerning the device file selected in S3024 and page information in the device file from the device file page information (table) 508 (see FIG. 6) and stores the device file information and the page information in the analysis target device file page information (table) 512 (see FIG. 10). The storage managing program 110 stores information (a pool identifier) of the hierarchical pool selected in S3205 in the shift destination hierarchical pool information (table) 2509 (see FIG. 29).

The shift target device file and shift destination hierarchical pool selection processing 2501 (S3102) ends.

<Configuration Example of a Shift Target Device File and Shift Target Hierarchical Pool Selection Screen (GUI)>

Figure 33:
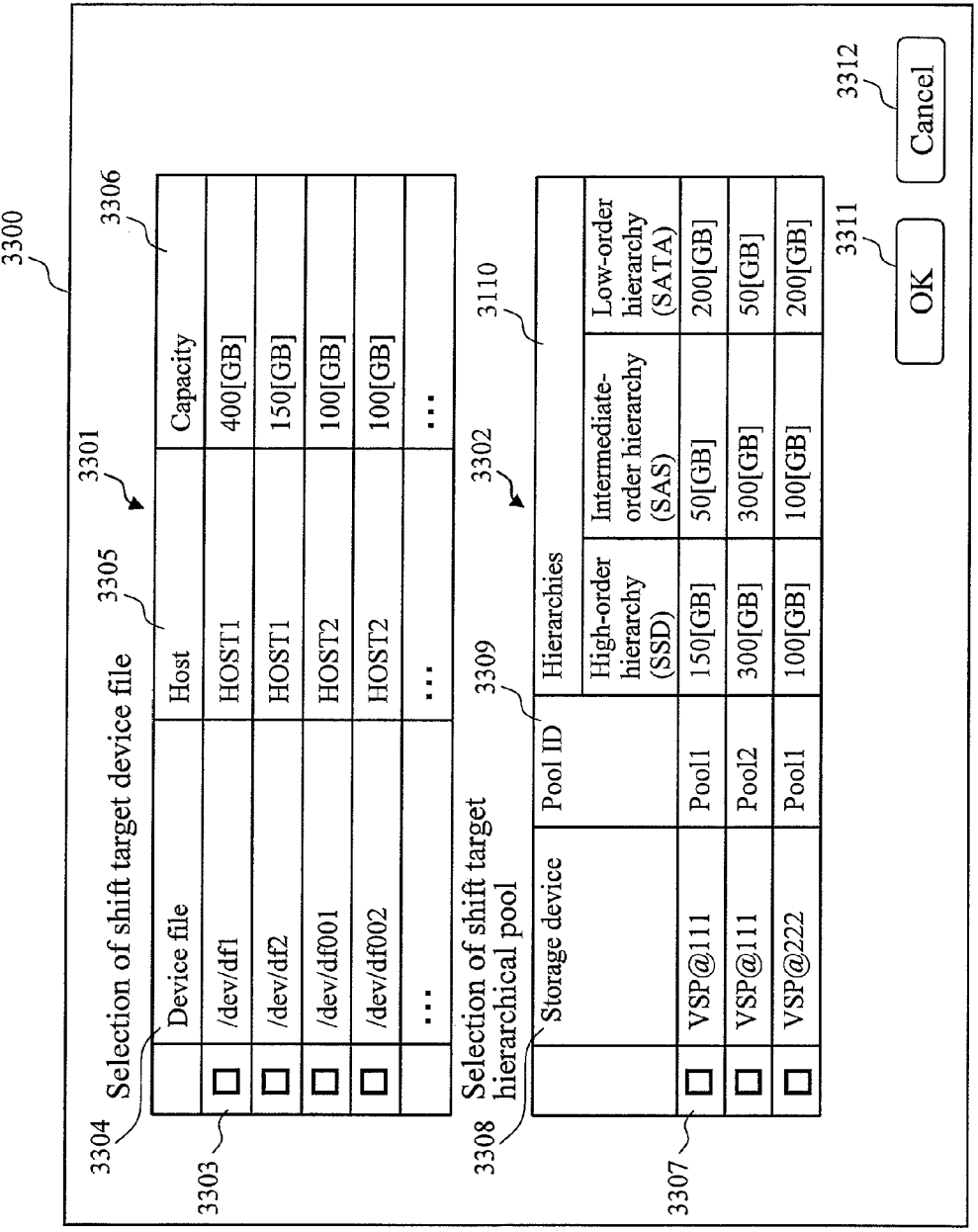
FIG. 33 is a diagram showing a configuration example of a shift target device file and shift target hierarchical pool selection screen (GUI).

FIG. 33 is a diagram showing a configuration example of a shift target device file and shift target hierarchical pool selection screen (GUI).

A shift target device file and shift target hierarchical pool selection screen (GUI) 3300 includes a shift target device file information display region 3301 for displaying choices of a shift target device file, a shift destination hierarchical pool information display region 3302 for displaying choices of a shift destination hierarchical pool, an OK button 3311 for deciding selection, and a cancel button 3312 for cancelling the selection.

In the shift target device file information display region 3301, a selection space 3303 in which the user can select a device file by checking a box, a device file name display space 3304 indicating a device file to be selected, a host space 3305 indicating a host server name to which a device file corresponding thereto belongs, and a capacity space 3306 indicating a capacity of a logical volume managed by the corresponding device file are displayed.

In the shift destination hierarchical pool information display region 3302, a selection space 3307 in which the user can select a pool by checking a box, a storage device space 3308 indicating information for identifying a storage device in which a pool is present, a pool ID space 3309 indicating identification information or a name of a pool to be selected, and a hierarchy space 3310 indicating capacities allocated from hierarchies included in a pool corresponding thereto are displayed.

<Details of the Analysis Target Page Specifying Processing (S3103)>

Figure 34:
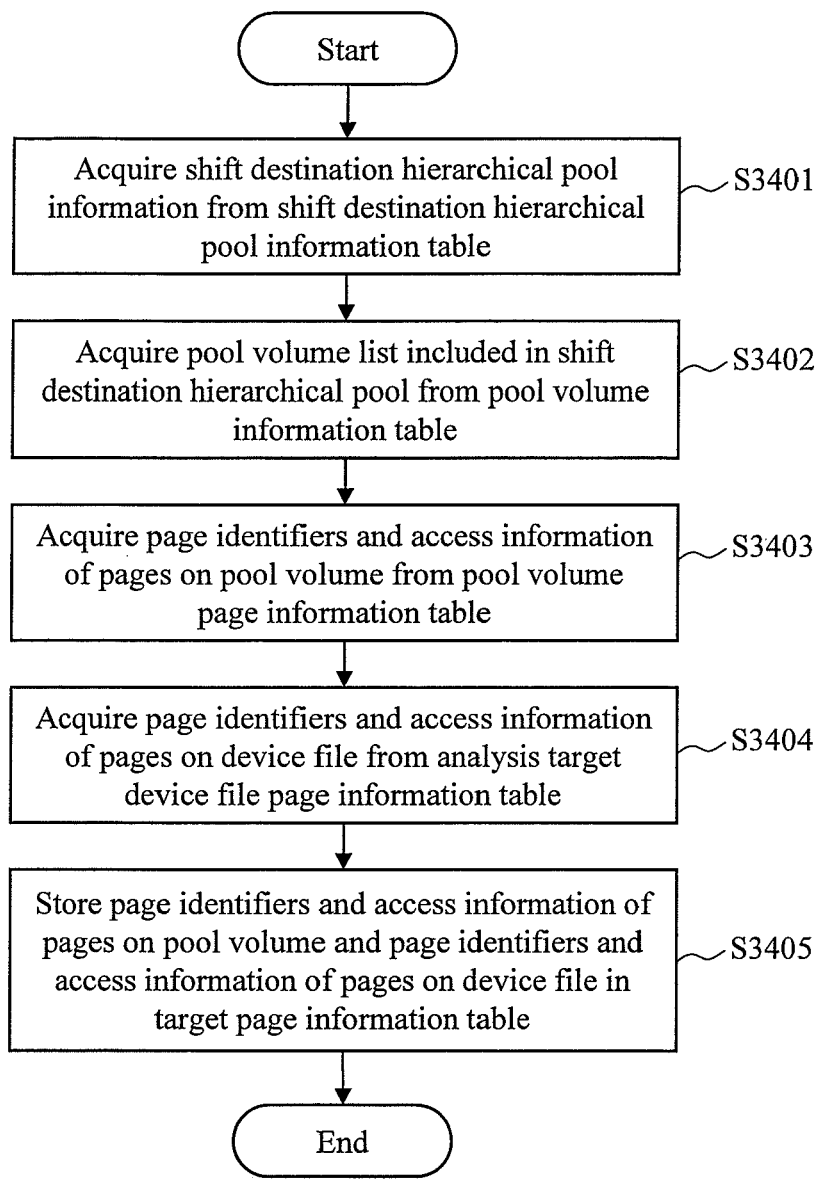
FIG. 34 is a flowchart for explaining details of analysis target page specifying processing 2502 (S3103).

FIG. 34 is a flowchart for explaining details of the analysis target page specifying processing 2502 (S3103).

In S3401, the storage managing program 110 acquires shift destination hierarchical pool information (a pool identifier) from the shift destination hierarchical pool information (table) 2509 (see FIG. 29).

In S3402, the storage managing program 110 acquires, on the basis of the shift destination hierarchical pool information (the pool identifier) acquired in S3401, information concerning all pool volumes (PoolVol) included in the selected hierarchical pool from the pool volume information (table) 2508 (see FIG. 28).

In S3403, the storage managing program 110 acquires page identifiers and access information of pages on the pool volumes acquired in S3402 from the pool volume page information (table) 2506 (see FIG. 26). The information to be acquired is, for example, the pages 9000 to 9200 and access information corresponding to the pages (see FIG. 26).

In S3404, the storage managing program 110 acquires page identifiers and access information on the device files from the analysis target device file page information (table) S12 (see FIG. 10) acquired in S3102. Information to be acquired is, for example, the pages 100 to 130 and access information corresponding to the pages (see FIG. 10).

In S3405, the storage managing program 110 stores both the kinds of information acquired in S3403 and S3404 in the analysis target page information (table) 2510 (see FIG. 30).

<Details of the Hierarchical Pool Configuration Addition Candidate Display Processing (S3106)>

Figure 35:
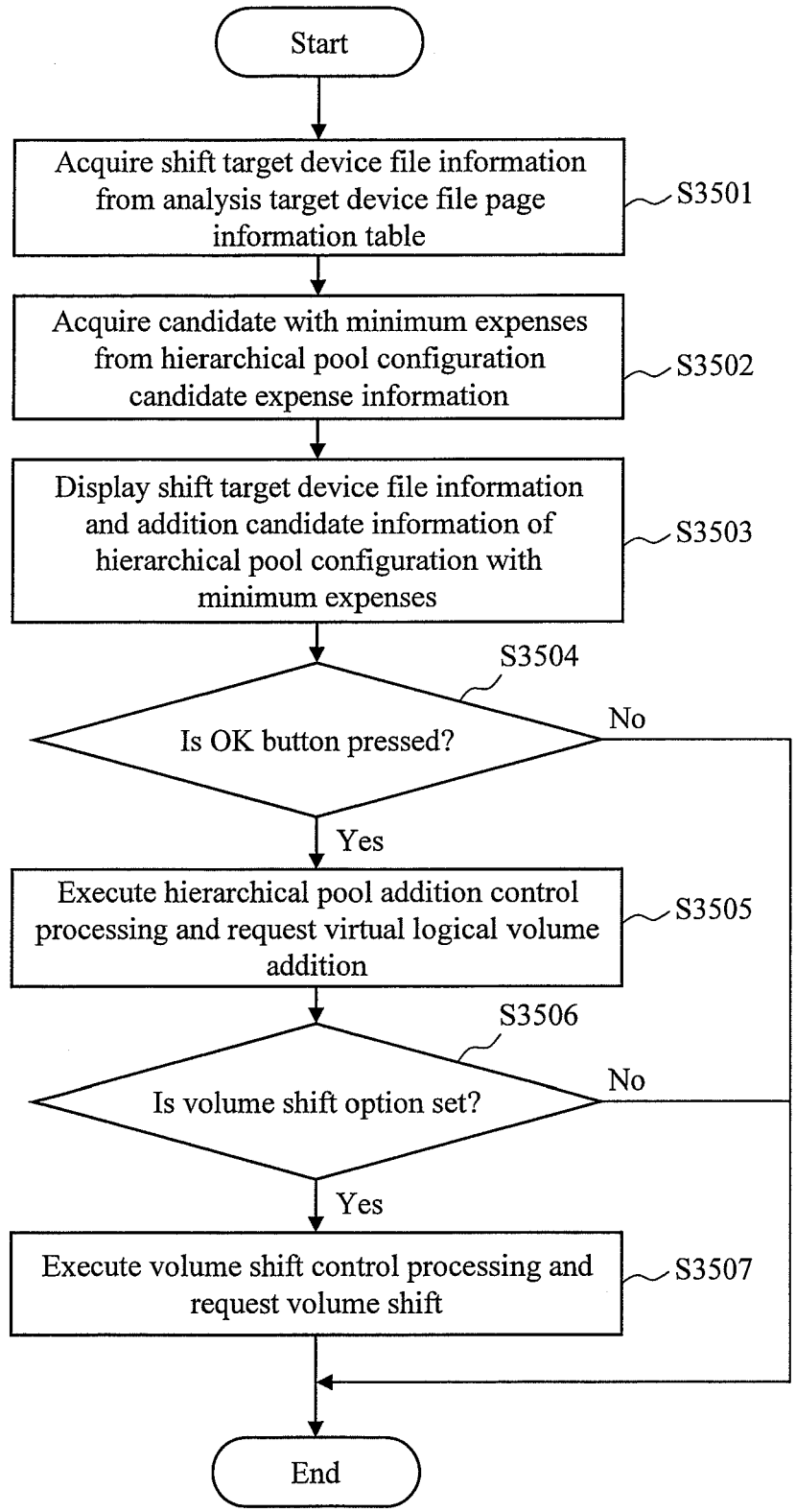
FIG. 35 is a flowchart for explaining details of hierarchical pool configuration addition candidate display processing 2504 (S3106).

FIG. 35 is a flowchart for explaining details of the hierarchical pool configuration addition candidate display processing 2504 (S3106).

In S3501, the storage managing program 110 acquires shift target device file information from the analysis target device file page information (table) 512 (see FIG. 10). The information to be acquired is, for example, a device file name or identification information for managing an I/O request to a logical volume to be shifted, a host name or identification information to which the device file name or the identification information belongs, and a capacity of the logical volume to be shifted (a capacity calculated from the device file).

In S3502, the storage managing program 110 acquires information (a candidate identifier) concerning a configuration candidate indicating minimum expenses from the hierarchical pool configuration candidate expense information (table) 515 (see FIG. 12) and acquires configuration information of the candidate from the hierarchical pool configuration candidate information (table) 513 (see FIG. 11).

In S3503, the storage managing program 110 generates a hierarchical pool configuration addition candidate display screen (GUI) using the shift target device file information and information concerning a hierarchical pool configuration with minimum expenses acquired in S3501 and S3502 and displays the hierarchical pool configuration addition candidate display screen (GUI) on the display screen of the storage managing client 101. A configuration example of the screen (GUI) is explained later with reference to FIG. 36.

In S3504, the storage managing program 110 determines whether an OK button is clicked by the user on the GUI (see FIG. 36). Specifically, the storage managing program 110 determines whether it is instructed to add a virtual logical volume having a configuration corresponding to an addition candidate displayed on the hierarchical pool configuration addition candidate display screen (GUI). When the OK button is not pressed and a cancel button is pressed (No in S3504), the storage managing program 110 ends the hierarchical pool configuration addition candidate display processing 2504. Alternatively, the storage managing program 110 may ends the entire virtual logical volume addition processing. When the OK button is pressed (Yes in S3504), the processing shifts to S3505.

In S3505, the storage managing program 110 executes the hierarchical pool addition control processing 2505 and instructs the hierarchical pool management control program 114 in the shift destination storage device 112 to create, on a selected existing pool, a virtual logical volume having calculated capacities from the hierarchies.

In S3506, the storage managing program 110 determines whether a volume shift option is set on the GUI (see FIG. 21). In other words, the storage managing program 110 determines whether the user selects to execute volume shift. When the volume shift option is not set when the OK button is pressed (No in S3506), the storage managing program 110 ends the hierarchical pool configuration addition candidate display processing 2504. Alternatively, the storage managing program 110 may end the entire shift processing. When the shift option is set when the OK button is pressed (Yes in S3506), the processing shifts to S3507.

In S3507, the storage managing program 110 executes the volume shift control processing 507 and instructs the volume shift executing program 115 in the shift destination storage device 112 to shift data of a logical volume of a shift source storage device to the virtual logical volume created at S3505.

<Example of the Hierarchical Pool Configuration Addition Candidate Display Screen (GUI)>

FIG. 36 is a diagram showing a configuration example of a screen (GUI) generated by the hierarchical pool configuration candidate display processing 2404.

A hierarchical pool configuration addition candidate display screen 3600 includes a shift target device file information display region 3601, a shift destination hierarchical pool information display region 3602, a volume shift option designation region 3611, an OK button 3612, and a cancel button 3613.

In the shift target device file information display region 3601, a device file space 3603 indicating a device file name to be shifted, a host space 3604 indicating information for identifying a host server to which the device file belongs, and a capacity space 3604 indicating a total capacity of pages to be shifted are displayed.

In the shift destination hierarchical pool information display region 3602, a storage device space 3603 indicating information for specifying a shift destination storage device in which a virtual logical volume is added, a pool ID space 3607 indicating information for identifying an existing hierarchical pool in which a virtual logical volume is added, an information space 3608 indicating whether a configuration is a configuration before shift or a configuration after shift, a hierarchy space 3609 indicating information concerning allocated capacities from the hierarchies before shift and allocated capacities from the hierarchies after shift, and an expense space 3610 indicating expenses required for virtual logical volume addition are displayed.

The volume shift option 3611 is a button for instructing whether data of a logical volume of a shift source storage device is shifted to a virtual logical volume to be added.

The OK button 3612 is a button for instructing presence or absence of addition of a virtual logical volume and volume shift.

The cancel button 3613 is a button for instructing cancellation of addition of a virtual logical volume and volume shift.

(3) Conclusion (i) In the present invention explained above, the management server stores, in the memory, management information for a logical volume of a shift source storage device by a device file of the host server (access information indicating an access load in a page unit to the logical volume) and information concerning the configuration and a capacity of hierarchies of a shift destination storage device. The management server calculates a capacity of the logical volume (total number of pages×capacity of a page) on the basis of the management information of the device file and the information concerning the configuration and the capacity of the hierarchies and calculates a configuration candidate of a hierarchical pool which allocates a storage region for storing data included in the logical volume to a virtual logical volume. The calculated configuration candidate of the hierarchical pool is output to the storage managing client. In this way, it is possible to provide the configuration of the hierarchical pool in shifting the logical volume only from the information of the device file in the host server to the virtual logical volume of the shift destination storage device. Therefore, it is possible to realize efficiency of processing in a system change (switching from a storage device which does not support the hierarchical pool to a storage device which supports the hierarchical pool) without acquiring and analyzing configuration information of the shift source storage device.

The hierarchical pool configuration candidate is calculated such that storage regions of a high-order hierarchy included in the hierarchical pool are allocated to pages in order from a page having a highest access load indicated by the access information. The access information to the logical volume of the shift source storage device may include access load information excluding cache-hit access. Consequently, since an access load is estimated only by access actually made to the logical volume, more accurate access information is obtained. Therefore, a hierarchical pool configuration candidate close to an actual operation is obtained.

The management server calculates, on the basis of expense information of storage devices included in the hierarchies and information concerning a configuration candidate of the hierarchical pool, expenses in realizing the configuration candidate of the hierarchical pool (when plural candidates are calculated, expenses in realizing each of the candidates) and outputs the expenses together with the hierarchical pool configuration candidate. Consequently, the user (the administrator) can learn expenses in realizing the obtained candidate. When plural candidates are obtained, the user (the administrator) can compare expenses required in realizing each of the candidates. As the access information indicating the access load, the number of I/O requests per unit time, a data transfer amount, last access time, or the like is used.

Further, a target response performance value indicating response performance which the user desires to realize in a virtual logical volume may be able to be designated from the storage managing client. When the target response performance value is designated, the management server allocates the storage regions from the hierarchies to satisfy target response performance and calculates a configuration candidate of the hierarchical pool. Consequently, it is possible to present not only an inexpensive hierarchical pool configuration candidate which enables page allocation of a logical volume but also a candidate which guarantees the target response performance.

In the embodiments, the shift target in the shift source storage device is explained using the actual logical volume as an example. However, the shift target may be a virtual logical volume. Specifically, the shift source storage device may provide a virtual logical volume without using the hierarchical pool function and calculate a candidate of a configuration of a hierarchical pool (in the second embodiment, an added virtual logical volume) in the shift destination storage device on the basis of management information (access information) of a device file which manages access to the virtual logical volume.

(ii) In some case, an existing hierarchical pool is generated in the shift destination storage device. The existing pool is desired to be effectively utilized. In order to effectively utilize the existing pool, it is desirable to add a virtual logical volume on the existing pool.

In order to realize this, the management server further stores configuration information of the existing hierarchical pool of the shift destination storage device and information (information for specifying and identifying a page and access information to pages) concerning pages of an existing virtual logical volume set on the existing hierarchical pool. In calculating a hierarchical pool configuration candidate, the management server calculates a capacity of a logical volume which should be shifted (storage capacity per page×total number of pages). Further, the management server calculates, on the basis of the capacity of the logical volume which should be shifted, existing page information, information concerning the configuration and a capacity of hierarchies, and configuration information of the existing hierarchical pool, a configuration candidate of the hierarchical pool in adding, on the existing hierarchical pool, a virtual logical volume to which storage regions for storing data of the logical volume which should be shifted are allocated. Consequently, it is possible to effectively utilize the capacities provided by the hierarchies without increasing the number of hierarchical pools more than necessary.

When a hierarchical pool configuration candidate in adding a virtual logical volume is calculated, a group of pages of an existing virtual logical volume and a group of pages which should be shifted are arranged in order from one having highest access information and, concerning the respective page groups of the existing virtual logical volume and the added virtual logical volume, storage regions of a high-order hierarchy included in a hierarchical pool are allocated to the pages in order from a page having highest access information. Consequently, it is possible to reallocate the storage regions to the pages during addition of a virtual logical volume. Therefore, it is possible to more efficiently utilize the storage regions of the hierarchies.

(iii) The present invention can also be realized by a program code of software which realizes the functions of the embodiments. In this case, a storage medium having the program code recorded therein is provided to a system or an apparatus and a computer (or a CPU or an MPU) of the system or the apparatus reads out the program code stored in the storage medium. In this case, the program code itself read out from the storage medium realizes the functions of the embodiments. The program code itself and the storage medium having the program code stored therein constitutes the present invention. As the storage medium for supplying such a program code, for example, a flexible disk, a CD-ROM, a DVD-ROM, a hard disk, an optical disk, a magneto-optical disk, a CD-R, a magnetic tape, a nonvolatile memory card, or a ROM is used.

An OS (operating system) or the like running on a computer may perform a part or all of actual processing on the basis of an instruction of the program code and the functions of the embodiments may be realized by the processing. Further, after the program code read out from the storage medium is written in a memory on the computer, the CPU or the like of the computer may perform a part or all of the actual processing on the basis of an instruction of the program code and the functions of the embodiments may be realized by the processing.

Further, the program code of the software which realizes the functions of the embodiments may be stored in storing means such as a hard disk or a memory of the system or the apparatus or a storage medium such as a CD-RW or a CD-R by being distributed via a network and, when the program code is used, the computer (or the CPU or the MPU) of the system or the apparatus may read out and execute the program code stored in the storing means or the storage medium.

Lastly, it should be understood that the process and the technique explained herein are not essentially related to any specific apparatus and can also be implemented by any suitable combination of components. Further, general-purpose devices of various types can be used according to the teaching described herein. It may be understood that it is useful to build a dedicated apparatus to execute the steps of the method explained herein. Various inventions can be formed by an appropriate combination of the plural components disclosed in the embodiments. For example, several components may be deleted from all the components explained in the embodiments. Further, the components explained in the different embodiments may be combined as appropriate. The present invention is explained in relation to the specific examples. However, the specific examples are not for limitation but for explanation in every aspect. Those having skill in the art would understand that there are a large number of combinations of hardware, software, and firmware suitable for carrying out the present invention. For example, the software explained above can be implemented by programs or script languages in a wide range such as assembler, C/C++, perl, Shell, PHP, and Java®.

Further, in the embodiments, control lines and information lines considered to be necessary for explanation are shown. All control lines and information lines are not always shown in terms of a product. All the components may be connected to one another.

In addition, other implementations of the present invention are made apparent to those having ordinary knowledge in the technical field from the examination of the specification and the embodiments of the present invention disclosed herein. The explained various forms and/or components of the embodiments can be used independently or in any combination in a computerized storage system having a function of managing data. The specification and the specific examples are merely typical ones and the scope and the spirit of the present invention are indicated by claims.

REFERENCE SIGNS LIST 100 computer system (storage system)
101 storage managing client
102 LAN
103 host server
104 performance/configuration information collection server
105 management server
106 job software
107 application monitoring agent
108 host monitoring agent
109 storage monitoring agent
110 storage managing program
111 SAN switch
112 storage device (storage subsystem)
113 memory
114 hierarchical pool management control program
115 volume shift executing program
116 SSD (storage device in a high-order hierarchy)
117 SAS (storage device in an intermediate-order hierarchy)
118 SATA (storage device in a low-order hierarchy)
119 CPU (Central Processing Unit)

The invention claimed is:

1. A storage managing system which manages a first storage subsystem which generates plural hierarchies using plural storage devices having different performances, configures a hierarchical pool using the hierarchies, and provides a virtual logical volume from the hierarchical pool, the storage managing system comprising:
a memory for storing management information of a device file of a host server which manages access to a logical volume in a second storage subsystem different from the first storage subsystem and information concerning a configuration and a capacity of the hierarchies including the plural storage devices in the first storage subsystem; and
a processor which reads out the management information of the device file and the information concerning the configuration and the capacity of the hierarchies from the memory and executes, on the basis of the read-out information, configuration candidate calculation processing for calculating a capacity of the logical volume and calculating a configuration candidate of the hierarchical pool for allocating storage regions for storing data included in the logical volume to the virtual logical volume and configuration candidate output processing for outputting the configuration candidate of the hierarchical pool obtained by the configuration calculation processing.

2. A storage managing system according to claim 1, wherein
the memory has, as the management information of the device file, access information obtained by converting an access load to the logical volume into an access load per page, which is a unit of the storage regions allocated from the hierarchical pool, and
the processor calculates, in the configuration candidate calculation processing, the capacity of the logical volume according to a storage capacity per the page and a total number of pages included in the logical volume and allocates storage regions of a high-order hierarchy included in the hierarchical pool to the pages in order from a page having a highest access load indicated by the access information.

3. A storage managing system according to claim 2, wherein access information to the logical volume of the second storage subsystem includes access load information excluding cache-hit access.

4. A storage managing system according to claim 2, wherein the access information indicates an access load using at least one of a number of I/O requests per unit time, a data transfer amount, and last access time to the logical volume.

5. A storage managing system according to claim 2, wherein the processor acquires target response information indicating response performance which should be realized in the virtual logical volume and, in the configuration candidate calculation processing, allocates the storage regions from the hierarchies to satisfy the target response performance and calculates a configuration candidate of the hierarchical pool.

6. A storage managing system according to claim 1, wherein the processor executes, on the basis of expense information of the plural storage devices and information concerning the configuration candidate of the hierarchical pool obtained by the configuration candidate calculation processing, expense calculation processing for calculating expenses in realizing the configuration candidate of the hierarchical pool and outputs, in the configuration candidate output processing, the calculated expenses together with the configuration candidate.

7. A storage managing system according to claim 1, wherein
the memory further stores configuration information of a hierarchical pool already present in the first storage subsystem and existing page information concerning plural pages to which storage regions are provided from an existing first virtual logical volume set on the existing hierarchical pool, and
the processor calculates, in the configuration candidate calculation processing, on the basis of information concerning a capacity of a logical volume which should be shifted to the first storage subsystem, the existing page information, the information concerning the configuration and the capacity of the hierarchies, and the configuration information of the existing hierarchical pool, a configuration candidate of the hierarchical pool in adding, on the existing hierarchical pool, a second virtual logical volume to which storage regions for storing data of the logical volume are allocated.

8. A storage managing system according to claim 7, wherein
the existing page information includes information for specifying the plural pages of the first virtual logical volume and access information indicating access loads to the pages,
the information concerning the capacity of the logical volume is calculated according to a storage capacity per the page and a total number of pages included in the logical volume, and
the processor further allocates, concerning groups of pages to which storage regions are respectively allocated from the first and second virtual logical volumes, storage regions of a high-order hierarchy included in the hierarchical pool to the pages in order from a page having a highest access load indicated by the access information and executes the configuration candidate calculation processing.

9. A computer system comprising: the storage managing system according to claim 1, at least one storage subsystem including the first storage subsystem; and at least one host server to which the virtual logical volume is presented from the first storage subsystem, wherein
the host server divides a region of the device file into regions equivalent to pages, which are units of storage regions allocated from the hierarchical pool, converts access information to the logical volume of the second storage device into access information in the page unit and stores the access information, and transmits the access information in the page unit to the storage managing system, and
the storage managing system stores the access information in the page unit in the memory.

10. A storage managing method for managing, using a storage managing system including a memory and a processor, a first storage subsystem which generates plural hierarchies using plural storage devices having different performances, configures a hierarchical pool using the hierarchies, and provides a virtual logical volume from the hierarchical pool, the storage managing method comprising:
the processor acquiring management information of a device file of a host server which manages access to a logical volume in a second storage subsystem different from the first storage subsystem and information concerning a configuration and a capacity of the hierarchies including the plural storage devices in the first storage subsystem and storing the management information and the information concerning the configuration and the capacity in the memory;
the processor reading out the management information of the device file and the information concerning the configuration and the capacity of the hierarchies from the memory;
the processor executing, on the basis of the read-out information, configuration candidate calculation processing for calculating a configuration candidate of the hierarchical pool for allocating storage regions for storing data included in the logical volume to the virtual logical volume; and
the processor executing configuration candidate output processing for outputting the configuration candidate of the hierarchical pool obtained by the configuration calculation processing.

11. A storage managing method according to claim 10, further comprising the processor obtaining, as the management information of the device file, access information obtained by converting an access load to the logical volume into an access load per page, which is a unit of the storage regions allocated from the hierarchical pool, and storing the access information in the memory, wherein
the processor calculates, in the configuration candidate calculation processing, the capacity of the logical volume according to a storage capacity per the page and a total number of pages included in the logical volume and allocates storage regions of a high-order hierarchy included in the hierarchical pool to the pages in order from a page having a highest access load indicated by the access information.

12. A storage managing method according to claim 11, wherein access information to the logical volume of the second storage subsystem includes access load information excluding cache-hit access.

13. A storage managing method according to claim 11, further comprising the processor acquiring target response information indicating response performance which should be realized in the virtual logical volume, wherein
in the configuration candidate calculation processing, the processor allocates the storage regions from the hierarchies to satisfy the target response performance and calculates a configuration candidate of the hierarchical pool.

14. A storage managing method according to claim 10, further comprising the processor executing, on the basis of expense information of the plural storage devices included in the plural hierarchies and information concerning the configuration candidate of the hierarchical pool obtained by the configuration candidate calculation processing, expense calculation processing for calculating expenses in realizing the configuration candidate of the hierarchical pool, wherein
in the configuration candidate output processing, the processor outputs the calculated expenses together with the configuration candidate.

15. A storage managing method according to claim 10, further comprising the processor reading out, from the memory, configuration information of a hierarchical pool already present in the first storage subsystem and existing page information concerning plural pages to which storage regions are provided from an existing first virtual logical volume set on the existing hierarchical pool, wherein
the processor calculates, in the configuration candidate calculation processing, on the basis of information concerning a capacity of a logical volume which should be shifted to the first storage subsystem, the existing page information, the information concerning the configuration and the capacity of the hierarchies, and the configuration information of the existing hierarchical pool, a configuration candidate of the hierarchical pool in adding, on the existing hierarchical pool, a second virtual logical volume to which storage regions for storing data of the logical volume are allocated.

* * * * *